United States Patent
Uryu et al.

(10) Patent No.: US 10,227,086 B2
(45) Date of Patent: Mar. 12, 2019

(54) MOTOR CONTROL UNIT AND ELECTRIC POWER STEERING APPARATUS USING THE SAME AND VEHICLE

(71) Applicant: NSK LTD., Tokyo (JP)

(72) Inventors: Kyosho Uryu, Tokyo (JP); Shigeru Fukinuki, Tokyo (JP)

(73) Assignee: NSK LTD., Tokyo (JP)

( * ) Notice: Subject to any disclaimer, the term of this patent is extended or adjusted under 35 U.S.C. 154(b) by 175 days.

(21) Appl. No.: 15/507,814

(22) PCT Filed: Sep. 2, 2015

(86) PCT No.: PCT/JP2015/074974
§ 371 (c)(1),
(2) Date: Mar. 1, 2017

(87) PCT Pub. No.: WO2016/035826
PCT Pub. Date: Mar. 10, 2016

(65) Prior Publication Data
US 2017/0297612 A1    Oct. 19, 2017

(30) Foreign Application Priority Data

Sep. 2, 2014  (JP) .................................. 2014-177942
Aug. 28, 2015 (JP) .................................. 2015-169716
Aug. 28, 2015 (JP) .................................. 2015-169745

(51) Int. Cl.
*B62D 5/04*         (2006.01)
*H02P 6/28*         (2016.01)
(Continued)

(52) U.S. Cl.
CPC ......... *B62D 5/0463* (2013.01); *B62D 5/0457* (2013.01); *B62D 5/0475* (2013.01);
(Continued)

(58) Field of Classification Search
CPC ...... H02P 6/28; H02P 6/12; H02P 4/00; H02P 8/36; H02P 23/28; H02P 27/00;
(Continued)

(56) References Cited

U.S. PATENT DOCUMENTS

2009/0078493 A1* 3/2009 Nagase .................. B62D 5/046
                                                            180/443
2011/0205672 A1* 8/2011 Sakai .................... B62D 5/0487
                                                            361/18
(Continued)

FOREIGN PATENT DOCUMENTS

JP       2002-38984 A      2/2002
JP       2005-193751 A     7/2005
(Continued)

OTHER PUBLICATIONS

International Search Report for PCT/JP2015/074974 dated Nov. 17, 2015 [PCT/ISA/210].
(Continued)

*Primary Examiner* — Bentsu Ro
*Assistant Examiner* — Said Bouziane
(74) *Attorney, Agent, or Firm* — Sughrue Mion, PLLC

(57) ABSTRACT

A motor control unit which drives a motor through an inverter based on a calculated command value of a control section to which a power supply voltage is supplied, including: a charging/discharging mechanism for charging and discharging electric charges of an inverter voltage supplied to the inverter; and a separation means for separating the charging/discharging mechanism from the power supply voltage, wherein when a warning signal informing of a drop in the power supply voltage is inputted, the charging/discharging mechanism is separated from the power supply voltage by the separation means as well as a voltage is applied to the control section from the charging/discharging (Continued)

mechanism to avoid power supply reset of the control section. The motor may be a motor with multi-system windings.

14 Claims, 21 Drawing Sheets

(51) Int. Cl.
*B62D 6/08* (2006.01)
*H02P 6/12* (2006.01)
*H02P 27/06* (2006.01)

(52) U.S. Cl.
CPC ............ *B62D 5/0481* (2013.01); *B62D 6/08* (2013.01); *H02P 6/12* (2013.01); *H02P 6/28* (2016.02); *H02P 27/06* (2013.01)

(58) Field of Classification Search
CPC ..... H02P 29/00; B62D 5/0457; B62D 5/0481; B62D 6/08; B62D 5/04; H02H 7/08
See application file for complete search history.

(56) References Cited

U.S. PATENT DOCUMENTS

| | | |
|---|---|---|
| 2012/0161681 A1 | 6/2012 | Kuroda |
| 2014/0055059 A1* | 2/2014 | Uryu .................. H02P 27/06 318/9 |
| 2014/0136055 A1 | 5/2014 | Sugiyama et al. |
| 2015/0012161 A1* | 1/2015 | Kanekawa ............ H02M 1/32 701/22 |

FOREIGN PATENT DOCUMENTS

| | | |
|---|---|---|
| JP | 2005-256643 A | 9/2005 |
| JP | 2007-151366 A | 6/2007 |
| JP | 2009-255742 A | 11/2009 |
| JP | 2012-143037 A | 7/2012 |
| JP | 2013-224097 A | 10/2013 |
| WO | 2011/102028 A1 | 8/2011 |
| WO | 2014/073339 A1 | 5/2014 |

OTHER PUBLICATIONS

English translation of International Preliminary Report on Patentability for PCT/JP2015/074974, dated Jan. 20, 2017, [PCT/IPEA/409].

* cited by examiner

PRIOR ART

PRIOR ART

MOTOR CONTROL UNIT AND ELECTRIC POWER STEERING APPARATUS USING THE SAME AND VEHICLE

CROSS REFERENCE TO RELATED APPLICATIONS

This is a National Stage of International Application No. PCT/JP2015/074974 filed Sep. 2, 2015, claiming priority based on Japanese Patent Application No. 2014-177942 filed Sep. 2, 2014 and, Japanese Patent Application No. 2015-169716 filed Aug. 28, 2015 the contents of all of which are incorporated herein by reference in their entirety.

TECHNICAL FIELD

The present invention relates to a motor control unit, an electric power steering apparatus using the same and a vehicle. The motor control unit drives and controls a motor (including a motor having multi-system windings) by a control section (MCU, CPU, MPU, microcomputer or the like) and can securely avoid the power supply reset of the control unit by having a simple and inexpensive configuration even when the power supply voltage of the motor control unit drops or falls.

BACKGROUND ART

An electric power steering apparatus (EPS), which is equipped with a motor control unit and applies a steering assist force (assist force) to a steering mechanism of a vehicle by a rotational force of a motor, applies a driving force of the motor as the steering assist force to a steering shaft or rack shaft by a transmission mechanism such as gears, a belt or the like through a reducer. Such a conventional electric power steering apparatus performs a feedback control of a motor current to accurately generate the torque of the steering assist force. The feedback control adjusts the voltage applied to the motor so that a difference between a steering assist command value (a current command value) and a detected motor current value becomes small, and the adjustment of the voltage applied to the motor is generally performed by the adjustment of a duty of a PWM (Pulse Width Modulation) control.

A general configuration of the electric power steering apparatus (EPS) will be described with reference to FIG. 1. A column shaft 2 (a steering shaft, a handle shaft) of a handle (steering wheel) 1 is connected to steered wheels 8L and 8R via reduction gears 3, universal joints 4a and 4b, a rack and pinion mechanism 5 and tie rods 6a and 6b and further through hub units 7a and 7b. Moreover, the column shaft 2 is provided with a torque sensor 10 for detecting the steering torque Th of the handle 1, and a motor 20 for assisting the steering force of the handle 1 is connected to the column shaft 2 through the reduction gears 3. To a control unit (ECU) 30 for controlling the electric power steering apparatus, an electric power is supplied from a battery 13 as a power supply, and an ignition key signal is inputted via an ignition key 11. The control unit 30 calculates a current command value of an assist (steering assist) command based on a steering torque Th detected by the torque sensor 10 and a vehicle speed Vel detected by a vehicle speed sensor 12 and controls an electric current supplied to the motor 20 with a voltage control value Vref obtained by performing compensation or the like on the calculated current command value. A steering angle sensor 14 is not indispensable and may not be disposed, and the steering angle can be obtained from a rotational sensor connected to the motor 20.

The control unit 30 is connected to a controller area network (CAN) 40 for giving and receiving various information on the vehicle, and the vehicle speed Vel can also be received from the CAN 40. Moreover, the control unit 30 is also connected to a non-CAN 41 for giving and receiving communications other than the CAN 40, analog/digital signals, radio waves and so on.

In this electric power steering apparatus, the control unit 30 is configured mainly with a control section of an MCU (including a CPU, an MCU or the like), and general functions performed by a program in the control section are configured, for example, as shown in FIG. 2.

The functions and operations of the control unit 30 will be described with reference to FIG. 2. The steering torque Th from the torque sensor 10 and the vehicle speed Vel from the vehicle speed sensor 12 are inputted into a current command value calculating section 31, and the current command value calculating section 31 calculates a current command value Iref1 based on the steering torque Th and the vehicle speed Vel by using an assist map or the like. In an adding section 32A, the calculated current command value Iref1 is added to a compensation signal CM from a compensating section 34 for improving the characteristics. In a current limiting section 33, the maximum value of the added current command value Iref2 is limited. The current command value Irefm with the limited maximum value is inputted into a subtracting section 32B and subtracted by a detected motor current value Im.

The subtraction result I (=Irefm−Im) in the subtracting section 32B is proportional-integral (PI)-controlled by a PI-control section 35. The PI-controlled voltage control value Vref is inputted into a PWM-control section 36 together with a modulation signal (a carrier) CF, and a duty is calculated. The motor 20 is PWM-driven through an inverter 37 by a PWM signal for which the duty is calculated. The motor current value Im of the motor 20 is detected by a motor current detecting means 38 and inputted into the subtracting section 32B for the feedback.

The compensating section 34 adds a detected or estimated self-aligning torque (SAT) to an inertia compensation value 342 in an adding section 344, further adds a convergence control value 341 to the addition result in an adding section 345, and inputs the addition result as the compensation signal CM in the adding section 32A to improve the characteristics.

When the motor 20 is a three-phase brushless motor, the details of the PWM-control section 36 and the inverter 37 are configured, for example, as shown in FIG. 3. The PWM-control section 36 comprises a duty calculating section 36A and a gate driving section 36B. The duty calculating section 36A calculates PWM-duty values D1 to D6 for three phases by the voltage control value Vref in accordance with a predetermined equation. The gate driving section 36B drives gates of FETs serving as driving elements, by the PWM-duty values D1 to D6 as well as compensates dead time and turns ON/OFF the FETs. The modulation signal (the carrier) CF is inputted into the duty calculating section 36A, and the duty calculating section 36A calculates the PWM-duty values D1 to D6 in synchronization with the modulation signal CF. The inverter 37 comprises three-phase bridges of the FETs, and each FET is turned ON/OFF by the PWM-duty values D1 to D6 to drive the motor 20.

As well, a motor release switch 23 is interposed between the inverter 37 and the motor 20 to block the supply of electric current when the assist control is stopped or the like. The motor release switch 23 comprises FETs with a parasitic diode inserted in each phase.

For this electric power steering apparatus, in recent years, vehicles equipped with idle stop and sailing functions or the like have been put in practical use for the purposes of saving fuel consumption and reducing emissions (wastes). In these vehicles, a starter for cranking upon the restart of the engine generally consumes considerable electric power. Thus, especially when the vehicles are driven in an urban area and the like where the vehicles stop and start frequently repeatedly, the battery being the power supply is consumed tremendously as the frequency of starting the engine increases. In this type of idle stop vehicles, the operations of the electric power steering apparatus and the fan of the air conditioner are continued even during the automatic engine stop, and these controls are also factors to accelerate the consumption of the battery. Accordingly, a phenomenon where the battery voltage temporarily decreases greatly at the moment of the engine cranking occurs. Then, the power supply reset of the ECU and the MCU occurs, and there has been a trouble losing the learning contents and so on up to that time point.

Further, in addition to cope with the low voltage caused by the increase in the frequency of starting the engine as described above, a demand for the continuation functions of the control sections such as the ECU and the MCU at the low voltage is becoming very high for safety reasons.

As a solution to these problems, an idle stop vehicle of Japanese Unexamined Patent Publication No. 2002-38984 A (Patent Document 1) has been proposed. The idle stop vehicle disclosed in the Patent Document 1 comprises a voltage compensation controller and a voltage compensation circuit. In a normal engine operation, the voltage compensation controller opens both a discharging switch and charging switch of the voltage compensation circuit. When an engine stop signal is inputted, the voltage compensation controller closes the charging switch, and the electric current from a battery is supplied to a capacitor of the voltage compensation circuit to charge the capacitor. When the start is operated in accordance with the satisfaction of the engine starting conditions and an input voltage is lower than a first set value upon the starter operation due to the consumption of the battery, the voltage compensation controller opens the charging switch in the voltage compensation circuit and closes the discharging switch to discharge the electric charge accumulated in the capacitor. When the input voltage from the battery becomes a second set value abnormality, the voltage compensation controller opens the discharging switch to return to the initial state. In this way, the capacitor is charged before the engine start, and the voltage compensation circuit is operated in synchronization with the engine start.

Moreover, in addition to the contents of the above Patent Document 1, a driving voltage supply device of Japanese Unexamined Patent Publication No. 2005-256643 A (Patent Document 2) employs a driving voltage supply method which controls the supply of a driving voltage to electric loads in consideration of heat generation of the latter part, monitors the voltage of a battery constantly and boosts the voltage by a control unit and a boosting circuit when the voltage is lower than below the minimum voltage. A device of Japanese Unexamined Patent Publication No. 2009-255742 A (Patent Document 3) immediately determines the state of the battery upon a starter driving, reduces an assist force of an actuator of a mechanism of an electric power steering.

Furthermore, a vehicle motor control unit of Japanese Unexamined Patent Publication No. 2013-224097 A (Patent Document 4) has a relay switch provided between a battery and a capacitor of a motor driving circuit, and the relay is turned off for a predetermined period of time when a return (starter start) signal from the idling stop is received. When the battery becomes low voltage, a path for discharging from a capacitor to a battery is blocked, and power is supplied to a control section via a power supply path from the capacitor to the control section to prevent the reset of the control section. When the relay is turned on after a predetermined period of time elapses, the motor driving control is immediately started, thereby shortening the time taken from the engine restart to the motor driving.

THE LIST OF PRIOR ART DOCUMENTS

Patent Documents

Patent Document 1: Japanese Unexamined Patent Publication No. 2002-38984 A
Patent Document 2: Japanese Unexamined Patent Publication No. 2005-256643 A
Patent Document 3: Japanese Unexamined Patent Publication No. 2009-255742 A
Patent Document 4: Japanese Unexamined Patent Publication No. 2013-224097 A

SUMMARY OF THE INVENTION

Problems to be Solved by the Invention

However, the device of the Patent Document 1 has a complicated configuration and is expensive since the voltage compensation controller and the voltage compensation circuit are provided for the control.

According to the method of the Patent Document 2, because of the control of stopping the boosting of the power supply voltage when a predetermined period of boosting operation time has elapsed, a fine control such as determining a predetermined period of time based on the time elapsed from the last boosting operation end, and the provision of the boosting circuit, costs for both hardware configuration addition and software incorporation increase, and the configuration is complicated.

Moreover, although the device of the Patent Document 3 is a battery state determination device capable of achieving the determination of battery deterioration upon cranking at low cost, the device only warns to reduce the assist force of the actuator of the electric power steering mechanism or the like. Thus, there is a possibility that a part of the electric power steering functions is limited. The Patent Document 3 does not disclose a process after the detection of a low voltage state.

Furthermore, in the device of the Patent Document 4, the predetermined period of time that the relay is turned off must be set longer than the time that the voltage is being not more than a reset voltage due to the battery voltage decrease upon the start of the starter, and the time taken to drive the motor will be longer if the predetermined period of time is set longer.

The present invention has been made in light of the above circumstances, and an object of the present invention is to provide a highly reliable motor control unit which can securely prevent the power supply reset of a control section (MCU, microcomputer, etc.) by having a simple and inexpensive configuration even when the power supply (battery)

voltage decreases or drops, and an electric power steering apparatus equipped with the motor control unit and vehicle. A motor is also requested for the control unit using a motor having multi-system windings.

Means for Solving the Problems

The present invention relates to a motor control unit which drives a motor through an inverter based on a calculated command value of a control section to which a power supply voltage is supplied, the above-described object of the invention is achieved by that comprising: a charging and discharging mechanism for charging and discharging electric charges of an inverter voltage supplied to the inverter; and a separation means for separating the charging and discharging mechanism from the power supply voltage, wherein when a warning signal informing of a drop in the power supply voltage is inputted, the charging and discharging mechanism is separated from the power supply voltage by the separation means as well as a voltage is applied to the control section from the charging and discharging mechanism to avoid power supply reset of the control section; or comprising: a charging and discharging mechanism for charging and discharging electric charges of a motor driving voltage supplied to the motor driving circuit; a separation means for separating the charging and discharging mechanism from the power supply voltage by a configuration with an FET; and a voltage detecting section to detect the power supply voltage, wherein when a limit drop in the power supply voltage is recognized, the charging and discharging mechanism is separated from the power supply voltage by the separation means as well as a voltage is applied to the control section from the charging and discharging mechanism, and when restoration of the power supply voltage is recognized, the charging and discharging mechanism is connected to the power supply voltage by the separation means as well as a voltage is applied to the control section from the power supply voltage so as to avoid a power supply reset of the control section; or comprising: a control section which controls a motor having multi-system motor windings; plural inverters which are connected to a power supply and drive each of the multi-system motor windings by the control section; charging and discharging mechanisms respectively connected to the power supply through separation means as well as respectively connected to the plural inverters; and back flow preventing diodes respectively connected to the plural inverters, wherein when a warning signal informing of a voltage drop of the power supply is inputted, the plural charging and discharging mechanisms are separated from the power supply voltage by the separation means as well as a voltage is applied to the control section from the charging and discharging mechanisms to avoid a power supply reset of the control section.

Further, the above-described object of the invention is achieved by an electric power steering apparatus equipped with the above motor control unit in which the warning signal is inputted into the control section (MCU) from a CAN, wherein an assist force is applied to a steering system of a vehicle by a current command value calculated based on at least a steering torque; or a vehicle equipped with the above electric power steering apparatus.

Effects of the Invention

According to the motor control unit of the present invention having the power-supply reset preventing function, even when a battery voltage decreases due to cranking or the like, the voltage can be maintained by the discharge from a large-capacitance electrolytic capacitor, and the power supply reset of the control section (MCU, microcomputer and so on) can be avoided. The same effect can be obtained for a control unit of a motor having multi-system motor windings.

By equipping the electric power steering apparatus with the motor control unit having the above power-supply reset preventing function, the electric power steering apparatus having a highly reliable ECU can be provided, and the vehicle equipped with the electric power steering apparatus can be provided.

MODE FOR CARRYING OUT THE INVENTION

Figure 1:
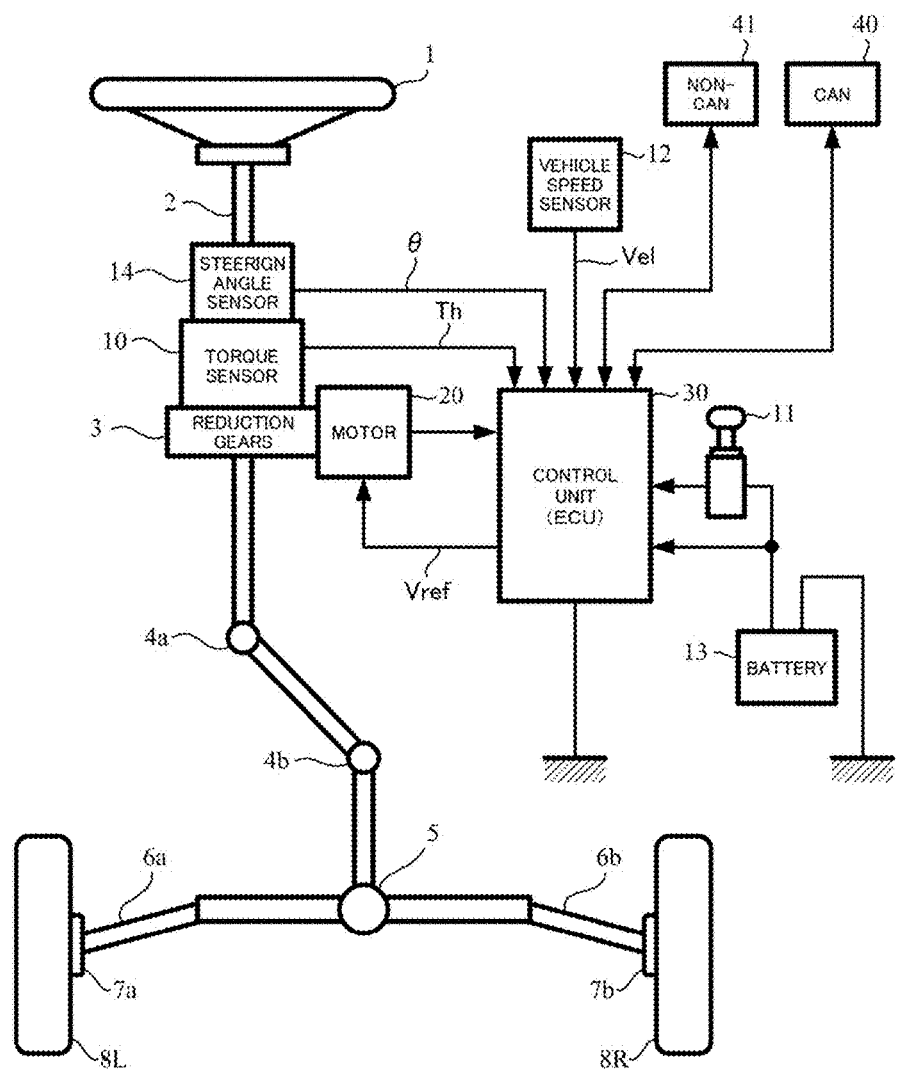
FIG. 1 is a configuration diagram showing a brief overview of an electric power steering apparatus.

By receiving a warning signal for a drop in a battery voltage from a CAN due to cranking or the like, the present invention changes a power supply path to a control section (MCU, microcomputer and so on) while maintaining the existent circuit configuration without adding a new boosting circuit or the like, and avoids the power supply reset of the control section. Accordingly, it is possible to cope with a low cost, and the configuration is simple.

In actual situation, electric charges accumulated in a large-capacitance electrolytic capacitor equipped in the existent inverter are supplied to a power supply of the control section. Thus, by switching an FET switch of a power supply line from a battery from "ON" to "OFF", a change of the power supply line to the electrolytic capacitor is realized. During this switching, the supply from the electrolytic capacitor can be several hundred milliseconds to several seconds (varies depending on a limitation amount of assist) while the time of the battery voltage drop due to the cranking is several 10 [ms] to 100 [ms]. Accordingly, the supply is stably performed. Although the assist limit or "OFF" occurs during the battery voltage drop, the power supply reset of the control section due to the battery voltage drop caused by the cranking is avoided, a trouble losing the learning contents and so on up to that time point is solved, and the operation of the electric power steering apparatus can be stabilized.

Further, the present invention also changes the power supply line to the control section by temporarily blocking a back flow protecting FET provided in the power supply line from the battery to avoid the power supply reset when a limit drop in the battery voltage (the power supply voltage) is recognized, that is, a situation where the battery voltage drops is recognized by receiving a signal for notifying in advance the start of the engine such as a starter start (cranking) from the vehicle (hereinafter, this signal is referred to as "starter notification signal"), when that the battery voltage is lower than a predetermined voltage (a motor drivable voltage) is detected. By blocking ("OFF") the FET, a motor-driving power supply line is disconnected from the battery, and electric charges accumulated in the large-capacitance electrolytic capacitor attached to a motor driving circuit are temporarily supplied to the power supply of the control section including the MCU. This delays the time of the decrease in the power supply voltage of the control section due to the drop in the battery voltage. Since the electrolytic capacitor and the back flow protecting FET are used as a charging and discharging mechanism and a separation means, respectively, without adding a new boosting circuit or the like, it is possible to cope with the low cost and the configuration is simple.

The FET is turned "ON" and the power supply from the battery is performed when the battery voltage restores and the battery becomes higher than a predetermined voltage (a motor-drive permission voltage), when the engine speed satisfies a predetermined control value.

As described above, the discharge of the electric charges accumulated in the electrolytic capacitor to the battery side is prevented by blocking the back flow protecting FET. Consequently, when the battery voltage restores, the motor driving circuit side can be charged through the parasitic diode without turning "ON" the FET, thereby charging the electrolytic capacitor. Moreover, by setting the motor-drive permission voltage on the minimum voltage required for driving and controlling the motor, it is possible to quickly start to drive and control the motor. Furthermore, by adding not only the starter notification signal but also a condition that the battery is lower than the motor drivable voltage to the starting condition of measures to prevent the back flow to the battery, the reset tolerance at a low voltage can be improved.

Hereinafter, the embodiments of the present invention will be described with reference to the drawings.

Figure 4:
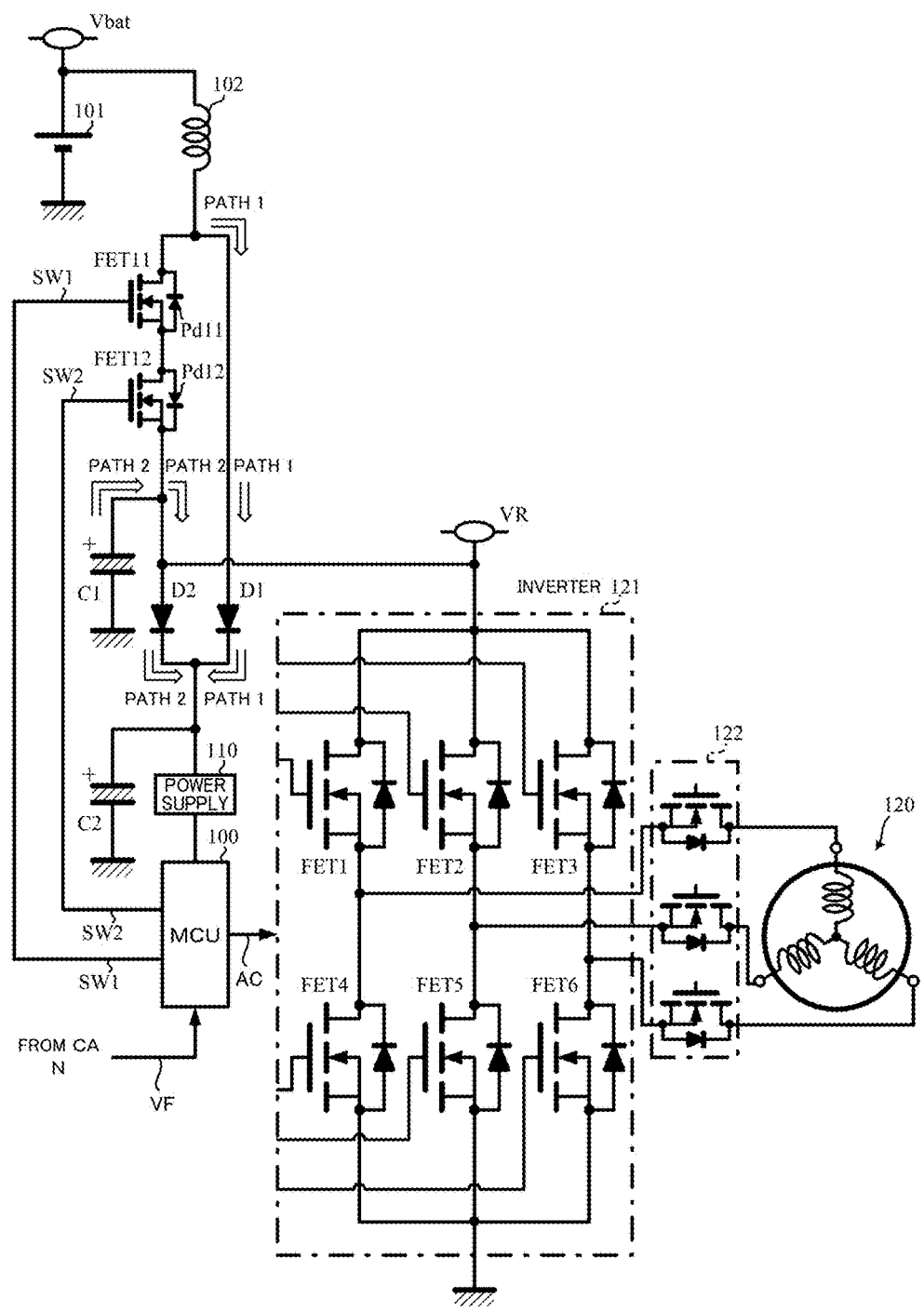
FIG. 4 is a connection diagram showing a configuration example (the first embodiment) of the present invention.

FIG. 4 shows the first embodiment of the present invention, in which an MCU 100, a control section incorporated in an ECU, drives and controls a motor 120 through an inverter 121 by using an assist command AC. A motor release switch 122 is interposed between the inverter 121 and the motor 120, and an inverter power supply VR is supplied to the inverter 121. The motor release switch 122 comprises FETs inserted in each phase, and each FET is connected to a parasitic diode. The inverter power supply VR is supplied to a power supply 110 of the MCU 100 via a back flow preventing diode D2 as well as charges a large-capacitance electrolytic capacitor C1. The electrolytic capacitor C1 functions normally as a power supply smoothing capacitor of the inverter 121.

A voltage Vbat of a battery 101 serving as a power supply, is supplied to the power supply 110 via a noise filter 102 as a countermeasure against an electromagnetic compatibility (EMC) noise in a common mode and a normal mode, and further via a back flow preventing diode D1. A capacitor C2 used as a bypass capacitor of a system power supply is connected to a connection point of the power supply 110 and the diodes D1 and D2.

A warning signal VF for informing of the drop (including cancellation) in the battery voltage Vbat from a CAN is inputted into the MCU 100 from the CAN. FETs 11 and 12 are connected as "ON/OFF" switches between the inverter power supply VR and the battery 101. The FETs 11 and 12 are turned "ON/OFF" by switch signals SW1 and SW2 from the MCU 100. Moreover, parasitic diodes pd11 and pd12 are connected to the FETs 11 and 12, respectively.

The FET 11 is an "ON/OFF" switch for emergency blocking, and the FET 12 has a function of back flow protection as well as is an "ON/OFF" switch serving as a separation means. The FET 12 is turned "ON/OFF" by the switch signal SW2 based on the input of the warning signal VF to the MCU 100.

Figure 5:
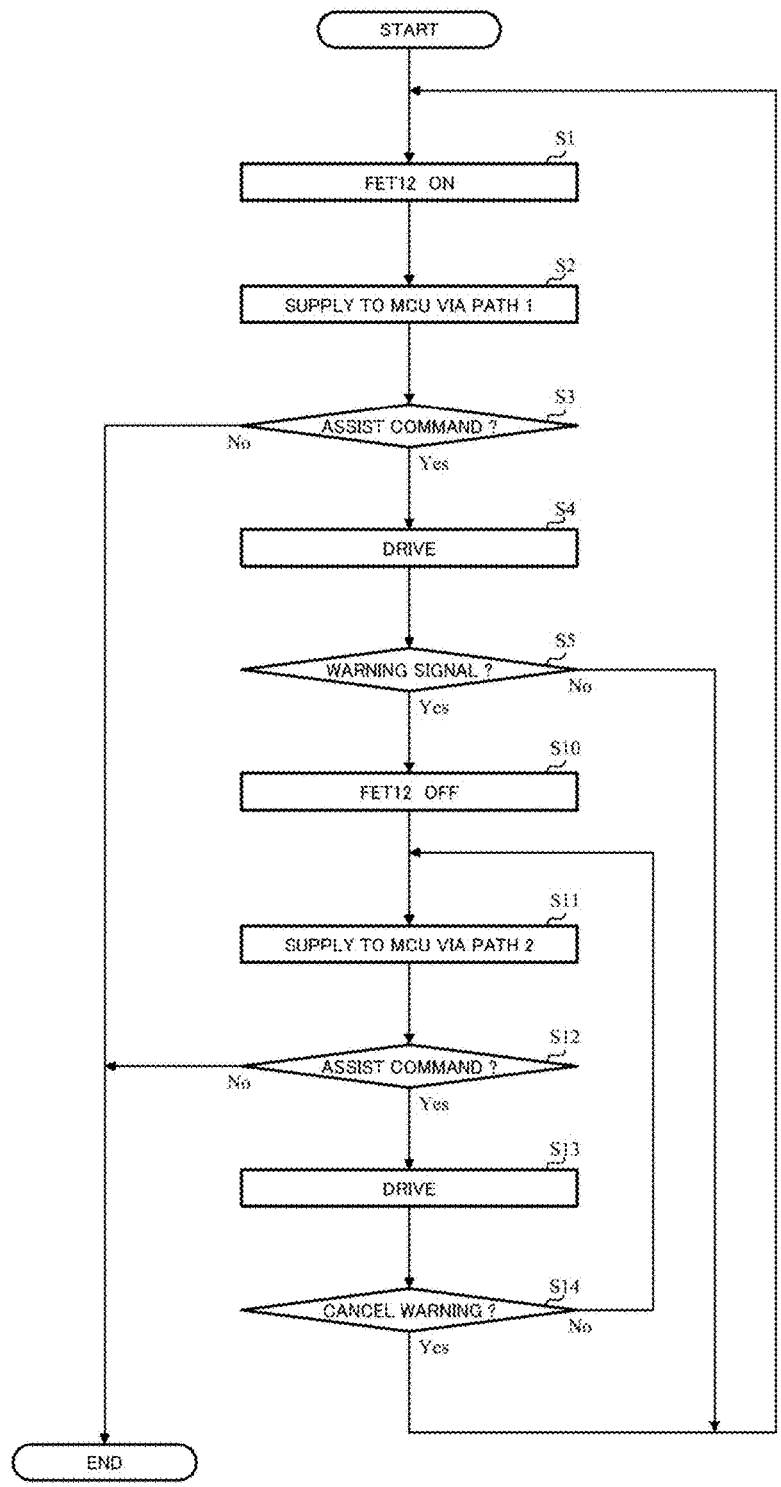
FIG. 5 is a flowchart showing an operation example (the first embodiment) of the present invention.

With this configuration, an operation example (the first embodiment) thereof will be described with reference to a flowchart in FIG. 5.

When the operation starts, the FET 11 is normally "ON", the FET 12 is turned "ON" by the switch signal SW2 (Step S1), and power is supplied to the MCU 100 via the illustrated path 1 (Step S2). That is, the battery voltage Vbat of the battery 101 is supplied to the power supply 110 via the noise filter 102 and further via the diode D1. As well, the inverter voltage VR is a voltage resulted from charging the electrolytic capacitor C1 by the battery voltage Vbat via the noise filter 102 and the FETs 11 and 12.

Then, when the MCU 100 outputs the assist command AC (Step S3), the inverter 121 drives the motor 120 by a separately calculated current command value (Step S4). Then, the process returns to the Step S1 and the above operations are repeated until the battery voltage decreases due to the cranking or the like and the warning signal VF is inputted into the MCU 100 from the CAN (Step S5).

When the warning signal VF is inputted from the CAN at the above Step S5, the MCU 100 outputs the switch signal SW2 to turn "OFF" the FET 12 serving as the separation means (Step S10). The electric charges charged in the electrolytic capacitor C1 from the battery 101 by turning "OFF" the FET 12, that is, the electric charges charged in the electrolytic capacitor C1 by being temporarily separated from the inverter voltage VR are supplied to the power supply 110 via the diode D2 in a path 2 (Step S11). At this time, by the parasitic diode pd12 of the FET 12, the current does not reversely flow to the battery 101. When the MCU 100 outputs the assist command AC (Step S12), the inverter 121 drives the motor 120 by the separately calculated current command value (Step S13), and the process returns to the above Step S11 and the above operations are repeated until a signal VF for warning cancellation is inputted from the CAN (Step S14).

When the battery voltage restores and the signal VF for warning cancellation is inputted, the process returns to the Step S1 and the FET 12 is turned "ON" by the switch signal SW2 (Step S1). At this time, even when the FET 12 is not completely turned "ON", power can be supplied to the inverter power supply VR through the parasitic diode pd12, and the assist control can be immediately performed.

In addition, when the assist command AC is not outputted at the Steps S3 and S12, the process ends in both cases.

Figure 6:
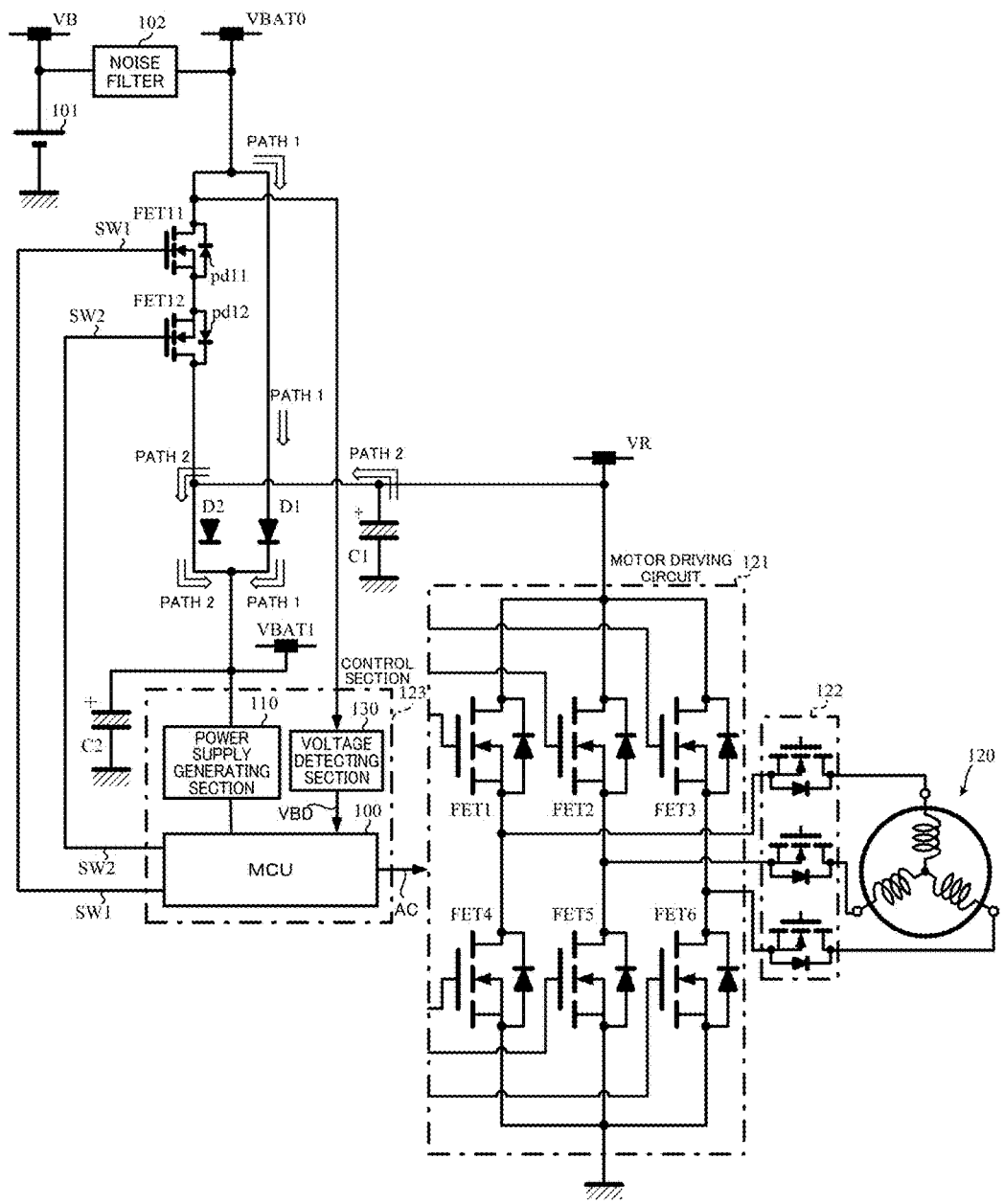
FIG. 6 is a connection diagram showing a configuration example (the second embodiment) of the present invention.

FIG. 6 shows the second embodiment correspondingly to FIG. 4, and a control section 123 in an ECU is provided with an MCU 100, a power generating section 110 and a voltage detecting section 130. The MCU 100 drives and controls the motor 120 via the motor driving circuit 121 by an assist command AC. The power generating section 110 supplies power to the MCU 100 based on power supplied from the outside. The voltage detecting section 130 detects a voltage VBAT0 at a drain end of an FET as a battery voltage and outputs the detected value as a battery voltage detected-value VBD to the MCU 100. A motor relay 122 is interposed between the motor driving circuit 121 and the motor 120, and a motor driving voltage VR is supplied to the motor driving circuit 121. The motor relay 122 comprises FETs inserted in each phase, and each FET is connected to a parasitic diode.

Power is supplied to the control section 123 and the motor driving circuit 121 from the battery 101 (voltage VB) via the noise filter 102 (voltage VBAT0). After passing the noise filter 102, power is supplied to the power generating section 110 in the control section 123 through the back flow protecting diode D1, and power is supplied to the motor driving circuit through the FETs 11 and 12. Note that the FET 11 can be eliminated as necessary.

The large-capacitance electrolytic capacitor C1 is connected to the motor driving circuit 121 and is normally used for power smoothing of the motor driving circuit 121.

A diode D2 is inserted in a forward direction of a motor driving voltage VR-line and a control section supply voltage VBAT1-line. This configuration enables the power supply from the motor driving voltage VR to the supply voltage VBAT1 when the supply voltage VBAT 1 is a voltage lower than the motor driving voltage VR. This route is configured so that the power can also be supplied from the motor driving circuit 121 to the control section 123 when the back flow protecting diode D1 provided in a power supply route to the control section 123 is in an open-failure.

The electrolytic capacitor C2 used as a bypass capacitor of the power generating section 110 is connected to a connection point of the power generating section 110 of the control section 123 and the diodes D1 and D2.

With this configuration, an operation example thereof will be described with reference to a flowchart in FIG. 7.

When the operation starts, the FET 11 is normally "ON", the FET 12 is turned "ON" by a switch signal SW2 (Step S20), and power is supplied to the control section 123 via a path 1 shown in FIG. 6 (Step S21). That is, the battery voltage VB of the battery 101 is supplied to the power generating section 110 in the control section 123 via the noise filter 102 and further via the diode D1. As well, the motor driving voltage VR is a voltage resulted from charging the electrolytic capacitor C1 by the battery voltage VB via the noise filter 102 and the FETs 11 and 12.

Then, when the MCU 100 in the control section 123 outputs the assist command AC (Step S22), the motor driving circuit 121 drives the motor 120 by a separately calculated current command value (Step S23). The voltage detecting section 130 detects the battery voltage (Step S24) and outputs the result as the battery voltage detected-value VBD to the MCU 100.

While the battery voltage detected-value VBD is not less than the motor drivable voltage, the process returns to the Step S20 (Step S25), and the above operations are repeated.

At the above Step S25, when the MCU 100 detects that the battery voltage detected-value VBD is lower than the motor drivable voltage due to the drop in the battery voltage caused by the cranking or the like, the motor 120 stops the drive (Step S26), and the FET 12 serving as the separation means is turned "OFF" by the switch signal SW2 (Step S27). By turning "OFF" the FET 12, it is possible to prevent the electric current from flowing from the electrolytic capacitor C1 in the motor driving voltage VR-line to the battery 101 even when the battery voltage decreases. In the control section 123, the electric charges accumulated in the electrolytic capacitor C2 in the supply voltage VBAT1-line are consumed (Step S30) when the control section supply voltage VBAT 1 is not less than the motor driving voltage VR (Step S28), and the electric charges accumulated in the electrolytic capacitor C1 are supplied to the power generating section 110 via the diode D2 in the path 2 shown in FIG. 6 (Step S31) when the supply voltage VBAT1 is lower than the motor driving voltage VR (Step S28).

With only the small-capacitance electrolytic capacitor C2, power required to drive the control section 123 is immediately consumed, and the supply voltage VBAT1 is decreased to a voltage which causes the power supply reset of the MCU (hereinafter, this voltage is referred to as "reset voltage").

However, by complementally supplying power from the large-capacitance electrolytic capacitor C1, it is possible to alleviate the time of the decrease in the supply voltage VBAT1 and keep the supply voltage VBAT1 not less than the reset voltage. Since the time of the decrease in the supply voltage VBAT1 can be alleviated more by increasing the capacity of the electrolytic capacitor C1, the capacity of the electrolytic capacitor C1 may be adjusted according to an estimated time of the decrease in the battery voltage.

Thereafter, when the battery voltage restores and becomes higher than the motor driving voltage VR, the electrolytic capacitor C1 is charged through the parasitic diode pd12 of the FET 12 which is turned "OFF". The voltage detecting section 130 continues to detect the battery voltage (Step S32). When the battery voltage detected-value VBD from the voltage detecting section 130 is not more than the motor-drive permission voltage (Step S33), the process returns to the Step S28 and the above operations are repeated. When the MCU 100 detects that the battery voltage detected-value VBD is higher than the motor-drive permission voltage (Step S33), the process returns to the Step S20 and repeats from the operation of turning "ON" the FET 12 by the switch signal SW2 (Step S20) to drive the motor 120. Note that the motor-drive permission voltage may be the same value as or a different value from the motor drivable voltage.

When the assist command AC is not outputted at the above Step S22, the process ends.

Figure 8:
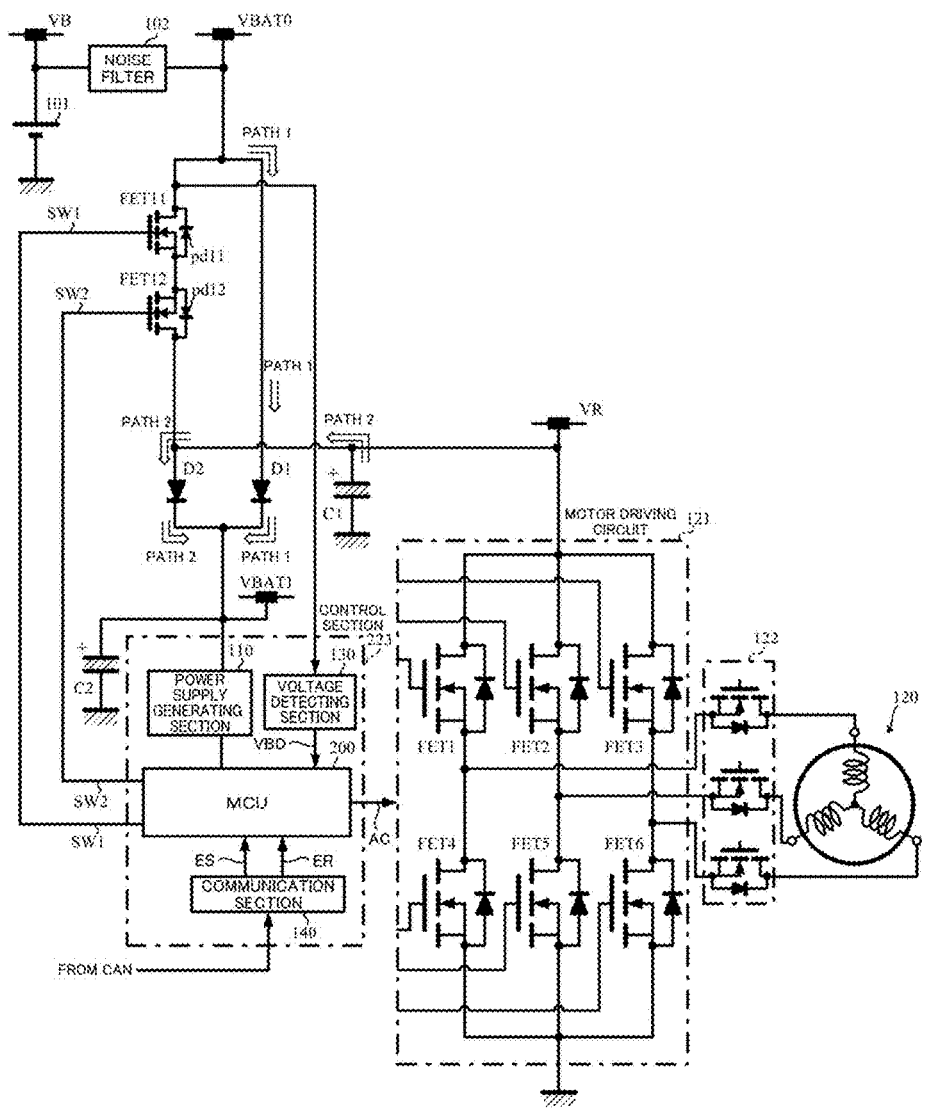
FIG. 8 is a connection diagram showing a configuration example (the third embodiment) of the present invention.

Moreover, FIG. 8 shows another configuration example (the third embodiment). Compared with the second embodiment shown in FIG. 6, a control section 223 is provided with a communication section 140 in addition to the MCU 100, the power supply generating section 110 and the voltage detecting section 130. The communication section 140 transmits and receives a starter notification signal and signals of an engine speed, a steering speed and so on to and from the vehicle. These signals are transmitted to and received from the CAN 40 shown in FIG. 1, but can also be transmitted to and received from the non-CAN 41. Among the received signals, the communication section 140 outputs a starter notification signal ES and an engine speed ER to an MCU 200. The MCU 200 recognizes that the battery voltage VB is in a state of decreasing by the input of the starter notification signal ES.

Moreover, the MCU 200 turns "ON" an FET 12 from "OFF" by the switch signal SW2 when the engine speed (rotational number) ER satisfies a predetermined control value, specifically, when a ratio (%) of the engine speed ER to the maximum allowable speed of the engine exceeds a predetermined control value. That is, in the third embodiment, when the starter notification signal ES is inputted (hereinafter, this is referred to as "OFF condition 2") is recognized as a limit drop in the battery voltage while, in the second embodiment, when the battery voltage detected-value VBD is lower than the motor drivable voltage (hereinafter, this is referred to as "OFF condition 1") is recognized as a limit drop in the battery voltage.

Furthermore, in the second embodiment, the timing at which the battery voltage restores and the FET 12 which is "OFF" is turned "ON" is defined as the time when the battery voltage detected-value VBD becomes higher than the motor-drive permission voltage (hereinafter, this is referred to as "ON condition 1"). By contrast, in the third embodiment, this timing is defined as the time when the engine speed ER satisfies the predetermined control value (hereinafter, this is referred to as "ON condition 2").

Besides, the predetermined control value for the engine speed ER may be set by the speed itself, not by the above ratio. That is, when the engine speed ER exceeds a predetermined speed, the FET 12 may be turned "ON" from "OFF".

Figure 9:
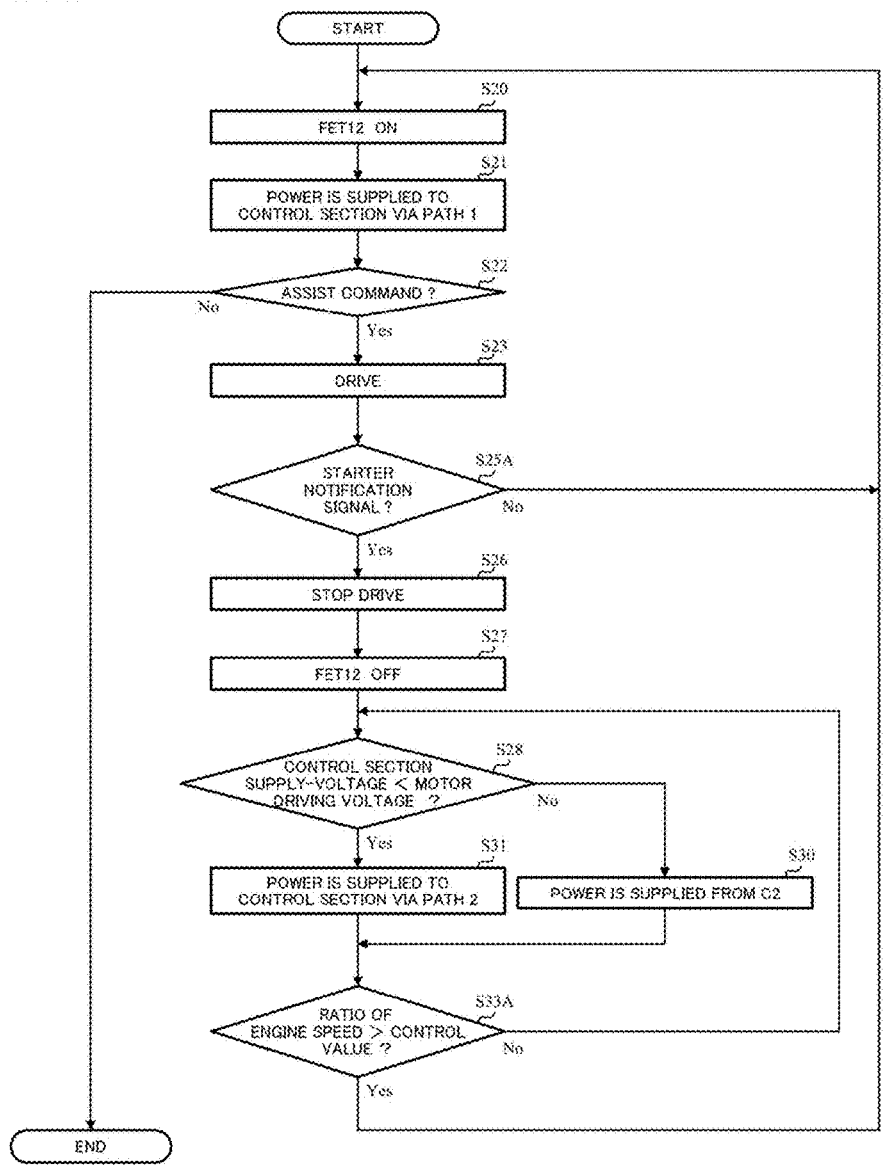
FIG. 9 is a flowchart showing an operation example (the third embodiment) of the present invention.

An operation example of the third embodiment will be described with reference to a flowchart in FIG. 9.

Figure 7:
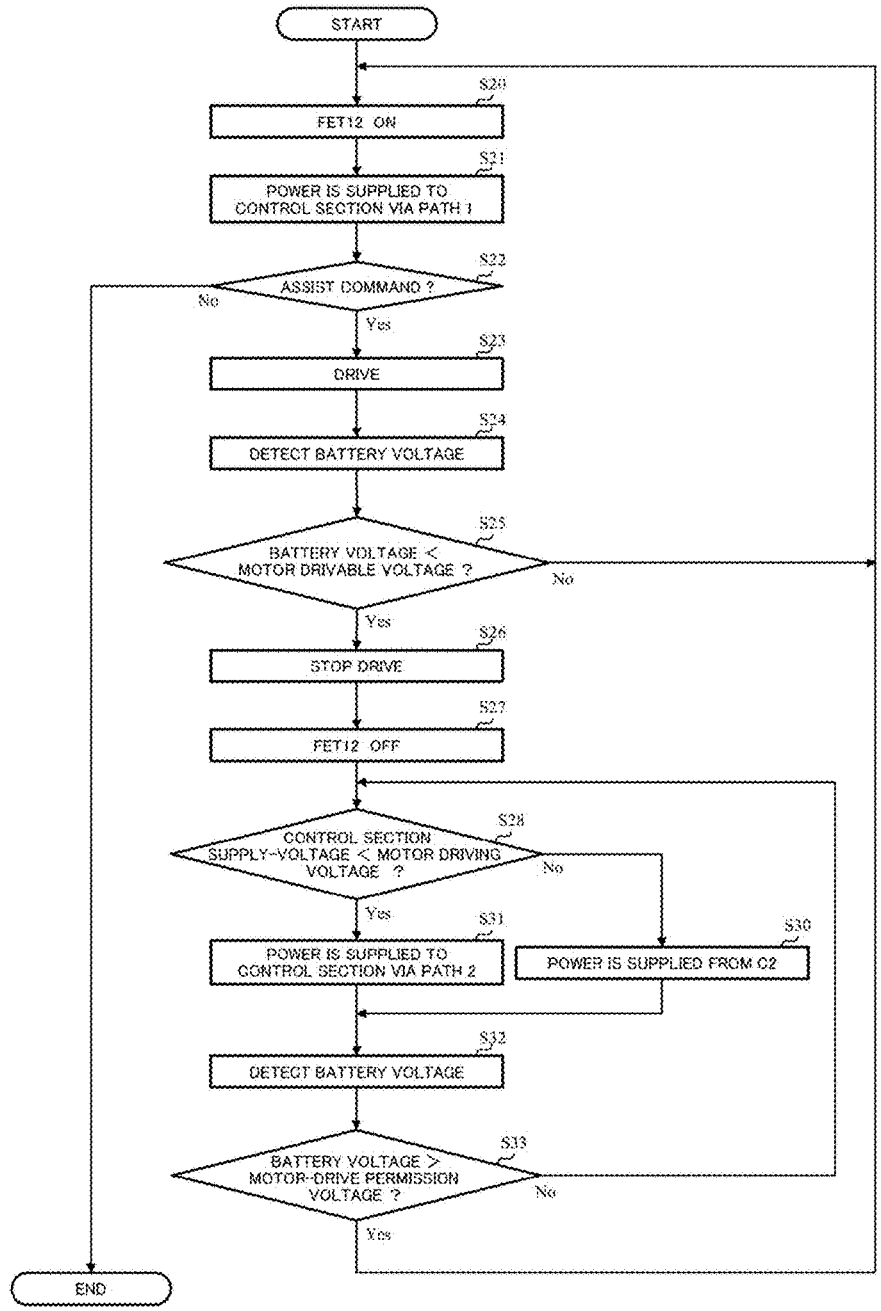
FIG. 7 is a flowchart showing an operation example (the second embodiment) of the present invention.

Compared with the operation example of the second embodiment shown in FIG. 7, the Steps S24 and S32 are eliminated and Steps S25A and S33A are executed in place of the Steps S25 and S33, respectively, since the battery voltage detected-value VBD outputted from the voltage detecting section 130 is not used. Other operations are the same as those in the operation example of the second embodiment, and the descriptions thereof will be omitted.

At the Step S25A, when the communication section 140 receives the starter notification signal ES from the CAN 40 and outputs the starter notification signal ES to the MCU 200 and further the MCU 200 inputs the starter notification signal ES, the motor 120 stops the drive (Step S26), and then the FET 12 is turned "OFF" by the switch signal SW2 (Step S27). Before the starter notification signal ES is received, the process returns to the Step S20, and the subsequent operations are repeated.

At the Step S33A, the communication section 140 receives the engine speed ER from the CAN 40 and outputs the engine speed ER to the MCU 200, and the MCU 200 calculates the ratio of the engine speed ER to the maximum allowable speed. When the ratio exceeds the predetermined control value, the process returns to the Step S20 and repeats from the operation of turning "ON" the FET 12 by the switch signal SW2 (Step S20) to drive the motor 120. When the ratio of the engine speed ER is not more than the predetermined control value, the process returns to the Step S28.

Note that, although the second embodiment employs a combination of the "OFF" condition 2 and the "ON" condition 2, a combination of the "OFF" condition 1 and the "ON" condition 2 or a combination of the "OFF" condition 2 and the "ON" condition 1 may be employed. Alternatively, a predetermined operation may be executed when either condition is satisfied. That is, when the "OFF" condition 1 or the "OFF" condition 2 is satisfied may be recognized as a limit drop in the battery voltage, and when the "ON" condition 1 or the "ON" condition 2 is satisfied, the FET 12 may be turned "ON". Moreover, a predetermined operation may be executed when both conditions are satisfied. That is, when both the "OFF" condition 1 and the "OFF" condition 2 are satisfied may be recognized as the limit drop in the battery voltage, and when both the "ON" condition 1 and the "ON" condition 2 are satisfied, the FET 12 may be turned "ON". By making the combination of conditions changeable, more flexible measures can be taken.

Figure 10:
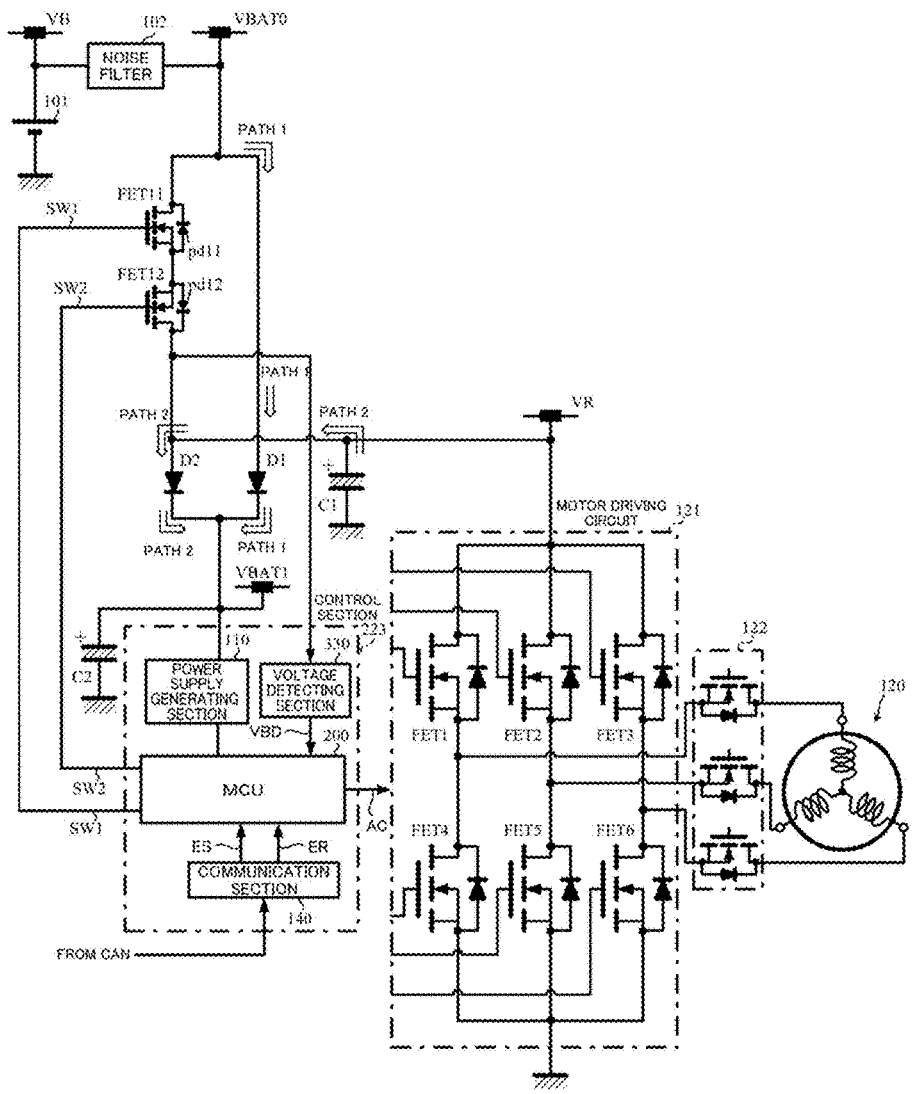
FIG. 10 is a connection diagram showing a configuration example (the fourth embodiment) of the present invention.

FIG. 10 shows the fourth embodiment of the present invention. Compared with the second embodiment shown in FIG. 6, a voltage detecting section 330 of a control section 323 detects a voltage at the source end of the FET, not the voltage VBAT0 at the drain end of the FET serving as the battery voltage. Since the voltage VBAT0 at the drain end and the voltage at the source end change in conjunction with each other, instead of the voltage VBAT0 at the drain end, the voltage at the source end can be detected as the battery voltage.

The operation example of the fourth embodiment is the same as the operation example of the second embodiment shown in FIG. 7, except that the voltage detecting section 330 detects the voltage at the source end as the battery voltage.

Figure 11:
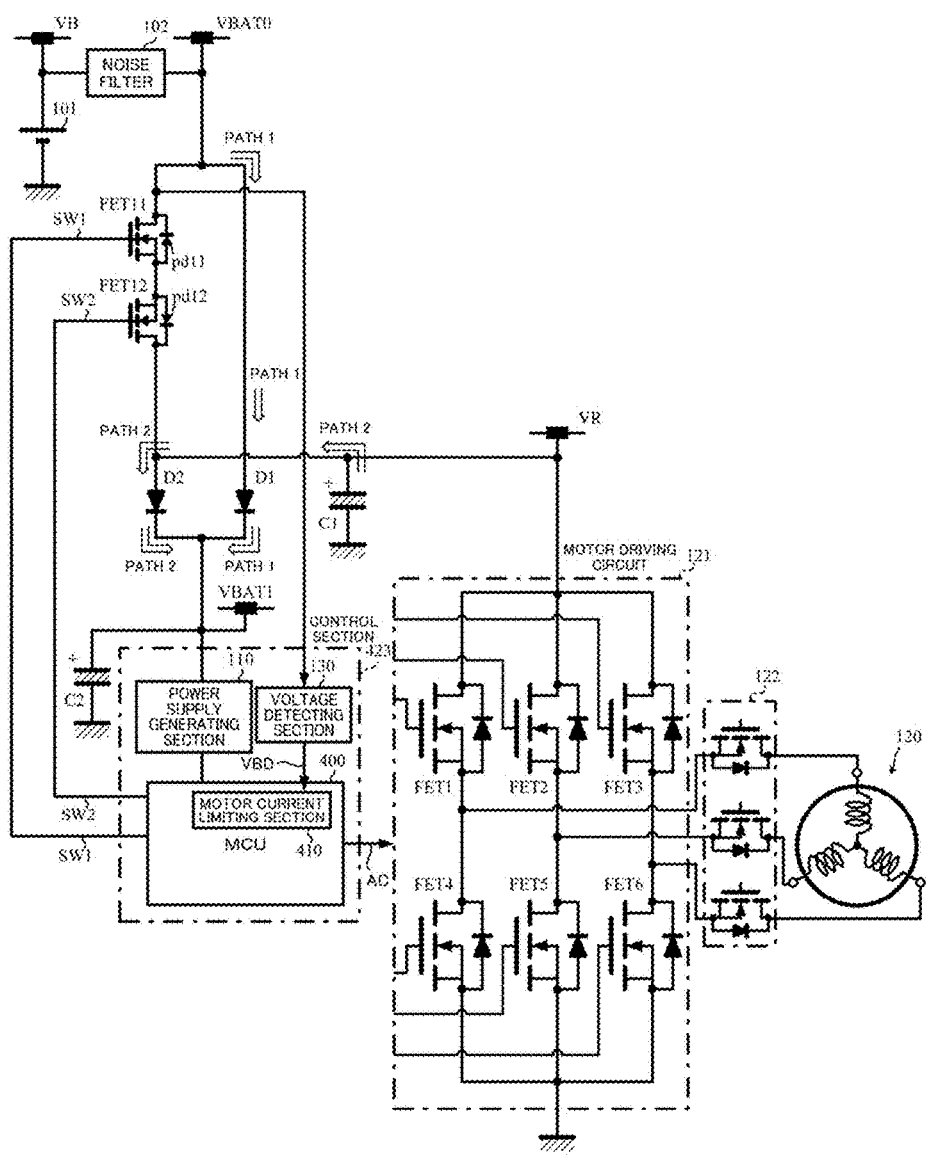
FIG. 11 is a connection diagram showing a configuration example (the fifth embodiment) of the present invention.

Moreover, FIG. 11 shows the fifth embodiment of the present invention. Compared with the second embodiment shown in FIG. 6, an MCU 400 in a control section 423 is provided with a motor current limiting section 410. The motor current limiting section 410 sets the upper-limit of the current for driving the motor according to the value of the battery voltage (hereinafter, this limit is referred to as "current upper-limit"), inputs the battery voltage detected-value VBD outputted from the voltage detecting section 130, determines the current upper-limit based on the battery voltage detected-value VBD, and limits the current for driving the motor.

Figure 2:
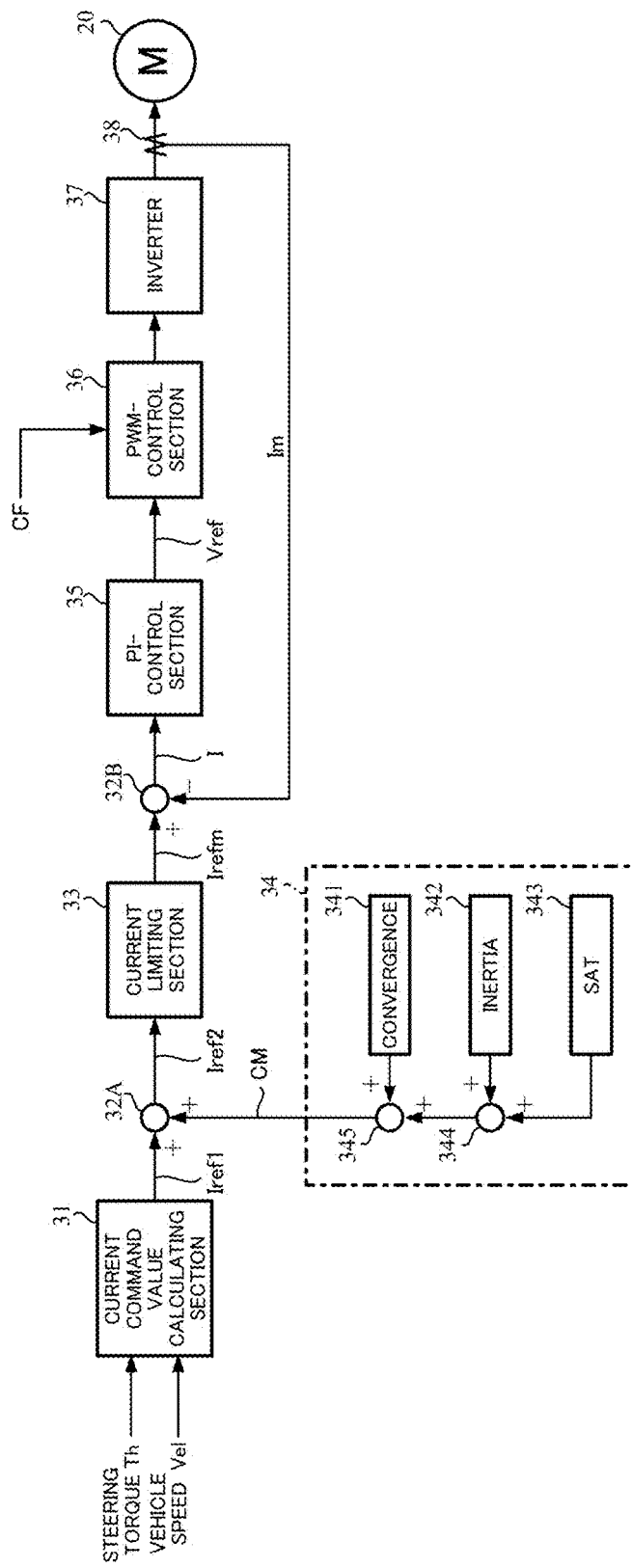
FIG. 2 is a block diagram showing a configuration example of a control system of the electric power steering apparatus.
Figure 3:
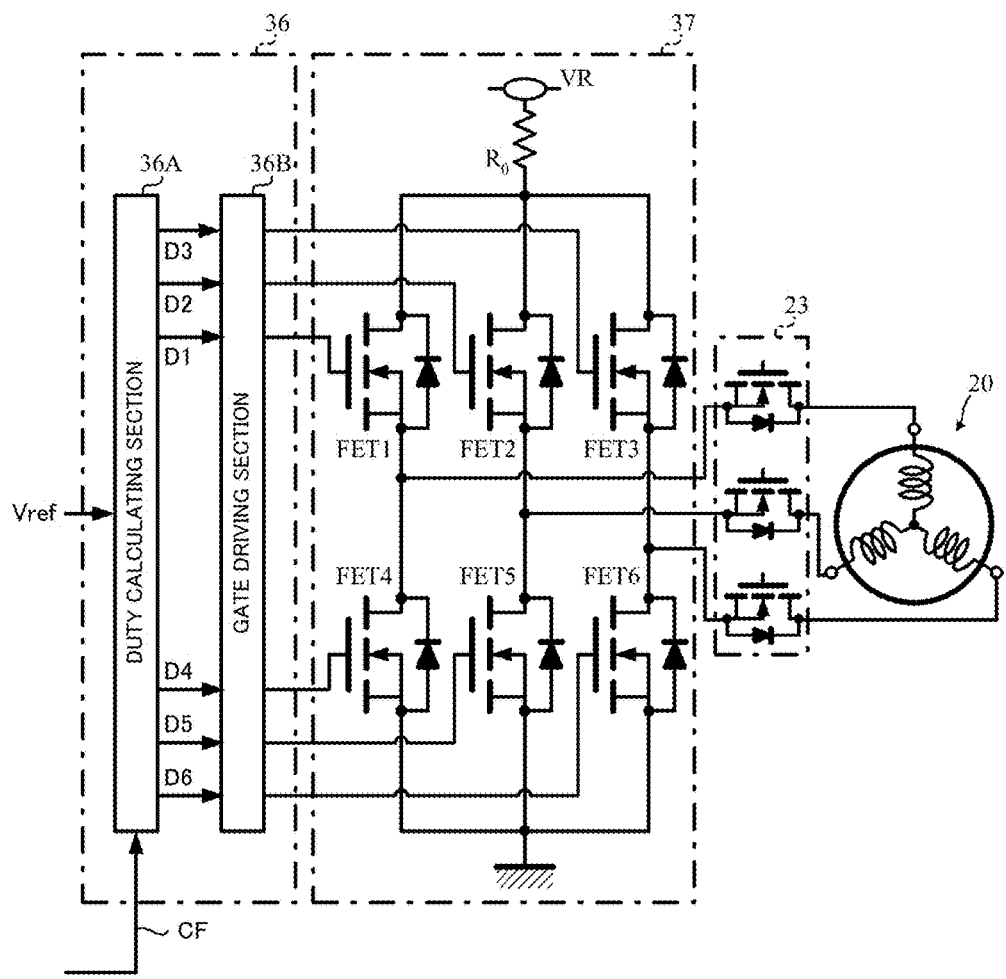
FIG. 3 is a connection diagram showing configuration examples of a PWM-control section and an inverter.

In this configuration example, a current command value is used as the current for driving the motor, and the ratio (%) of the current command value to the maximum allowable value is set as a subject of the current upper-limit. For example, when no limit is provided for the current command value and a value up to the maximum allowable value can be taken, the current upper-limit is 100%. This prevents a heat generating failure of the FETs when a large current flows in the motor 120 in a state where the battery voltage decreases and the voltage for driving the FETs in the motor driving circuit 121 decreases. The motor current limiting section 410 also compares the battery voltage detected-value VBD with the motor drivable voltage as well as compares the battery voltage detected-value VBD with the motor-drive permission voltage, as described in the operation example of the second embodiment. As well, the motor current limiting section 410 may also be used commonly as the current limiting section 33 shown in FIG. 2.

An example of setting the current upper-limit will be described with reference to FIG. 12.

Figure 12:
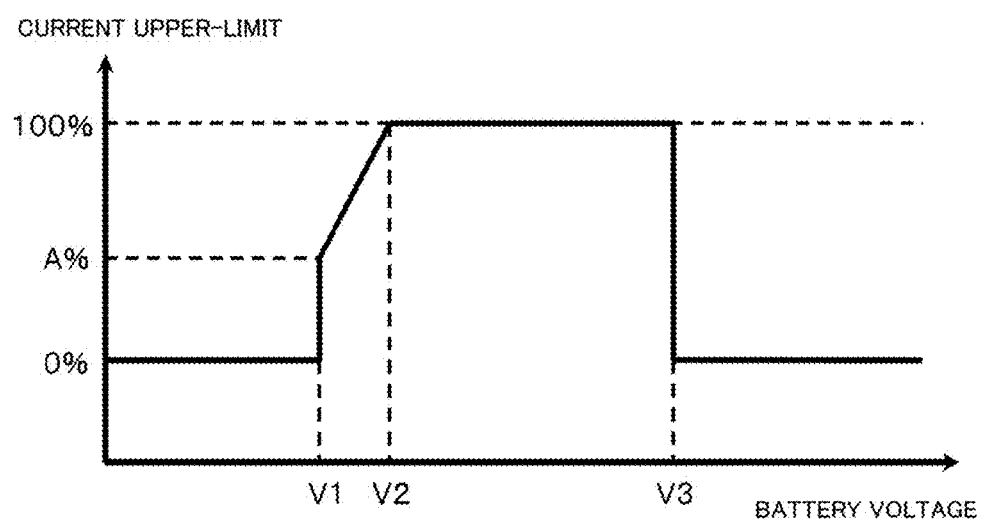
FIG. 12 is a characteristic diagram showing an example of setting a current upper-limit.

As shown in FIG. 12, when the battery voltage is less than a voltage V1, the current upper-limit is 0%, that is, the current command value is "0". When the battery voltage is not less than the voltage V1 and less than a voltage V2, the current upper-limit is set in proportion to the battery voltage in the range of A % to 100%. When the battery voltage is not less than the voltage V2 and less than a voltage V3, the current upper-limit is 100%. When the battery voltage is not less than the voltage V3, the current upper-limit is 0% again, that is, the current command value is "0". When the battery voltage is a high voltage, an FET failure may occur due to switching surge or the like. To prevent this, the current upper-limit is 0% when the battery voltage is not less than the voltage V3. The value of "A" is set in the range of 0% to 100% as necessary. Moreover, by setting the motor drivable voltage and the motor-drive permission voltage as the voltage V1, the current command value can be limited in conjunction with the change of the power supply line to the MCU.

Figure 13:
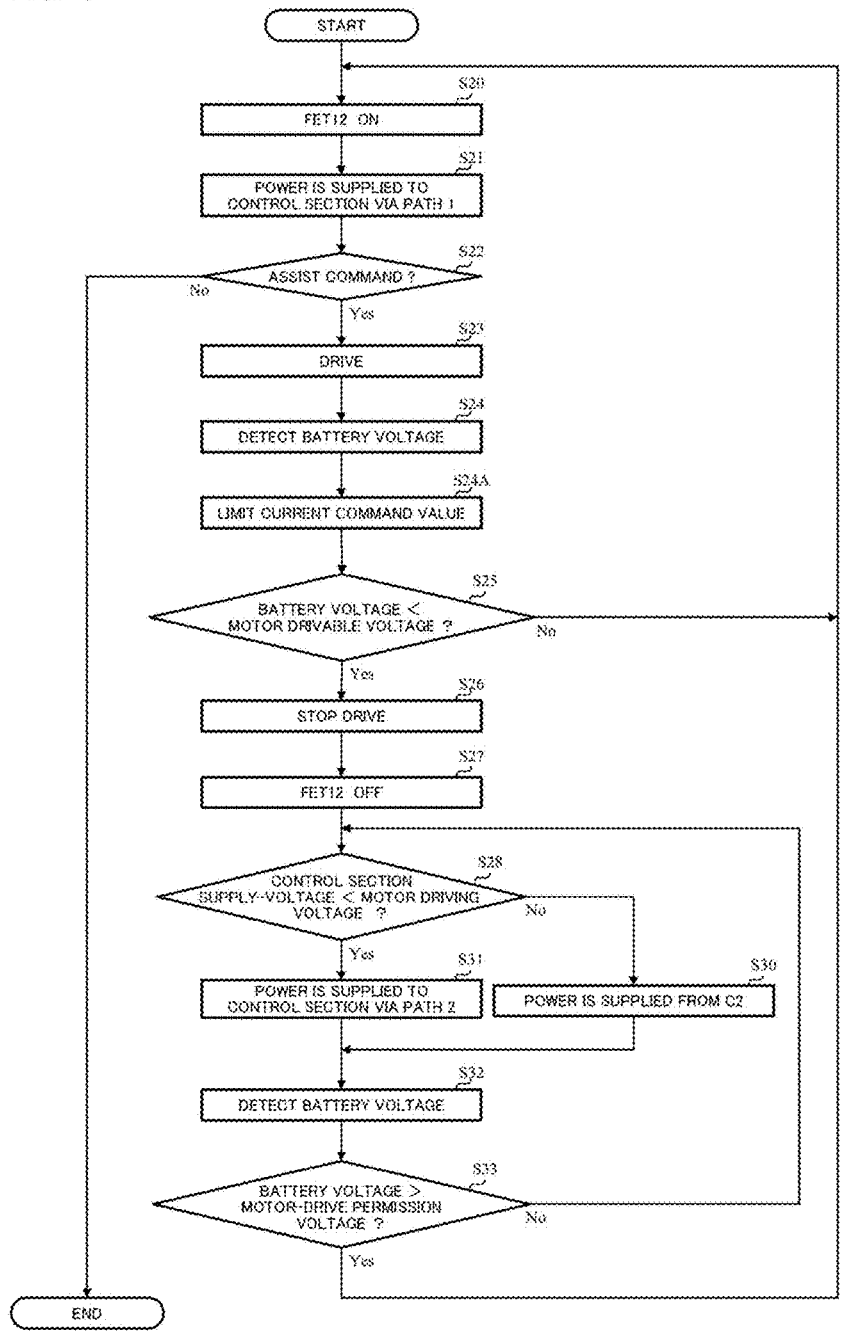
FIG. 13 is a flowchart showing an operation example (the fifth embodiment) of the present invention.

An operation example of the fifth embodiment will be described with reference to a flowchart in FIG. 13.

Compared with the operation example of the second embodiment shown in FIG. 7, a Step S24A of limiting the current command value is added. Since other operations are the same as those in the operation example of the second embodiment, the descriptions thereof will be omitted. Note that the Steps S25 and S33 are executed by the motor current limiting section 410.

Since the current command value is used to drive the motor 120 and the current upper-limit is determined based on the battery voltage detected-value VBD, the current command value is limited (Step S24A) after the motor is driven (Step S23) and the battery voltage is detected (Step S24). At the Step S24A, the motor current limiting section 410 determines the current upper-limit based on the characteristics shown in FIG. 12 by using the battery voltage detected-value VBD outputted from the voltage detecting section 130, and the current command value is limited by the determined current upper-limit. That is, the maximum allowable value of the current command value is multiplied by the value of the current upper-limit, the resultant value is set as the current command value when the current command value is larger than the resultant value, and the current command value remains unchanged when the current command value is not more than the resultant value.

As well, the subject of setting the current upper-limit may be the current command value itself, not the ratio of the current command value to the maximum allowable value.

Herein, an operation example according to the present invention will be described by using a time chart in comparison with a conventional example in which the power supply line is not changed.

First, the operation example (the example 1) will be described in which the input of the starter notification signal is recognized as the limit drop in the battery voltage ("OFF" condition 2), the FET 12 is turned "ON" when the battery voltage detected-value is higher than the motor-drive permission voltage ("ON" condition 1), the current command value is limited by the motor current limiting section 410, and the motor drivable voltage and the motor-drive permission voltage are the voltage V1. Note that the current command value is also limited in the conventional example.

Figure 14:
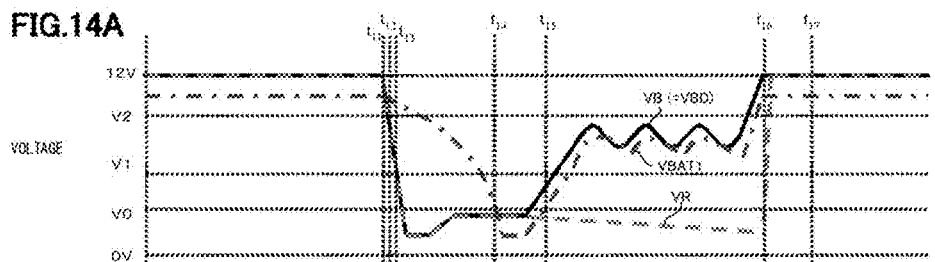
FIGS. 14A-14F are time chart showing an operation example of a conventional example.
Figure 15:
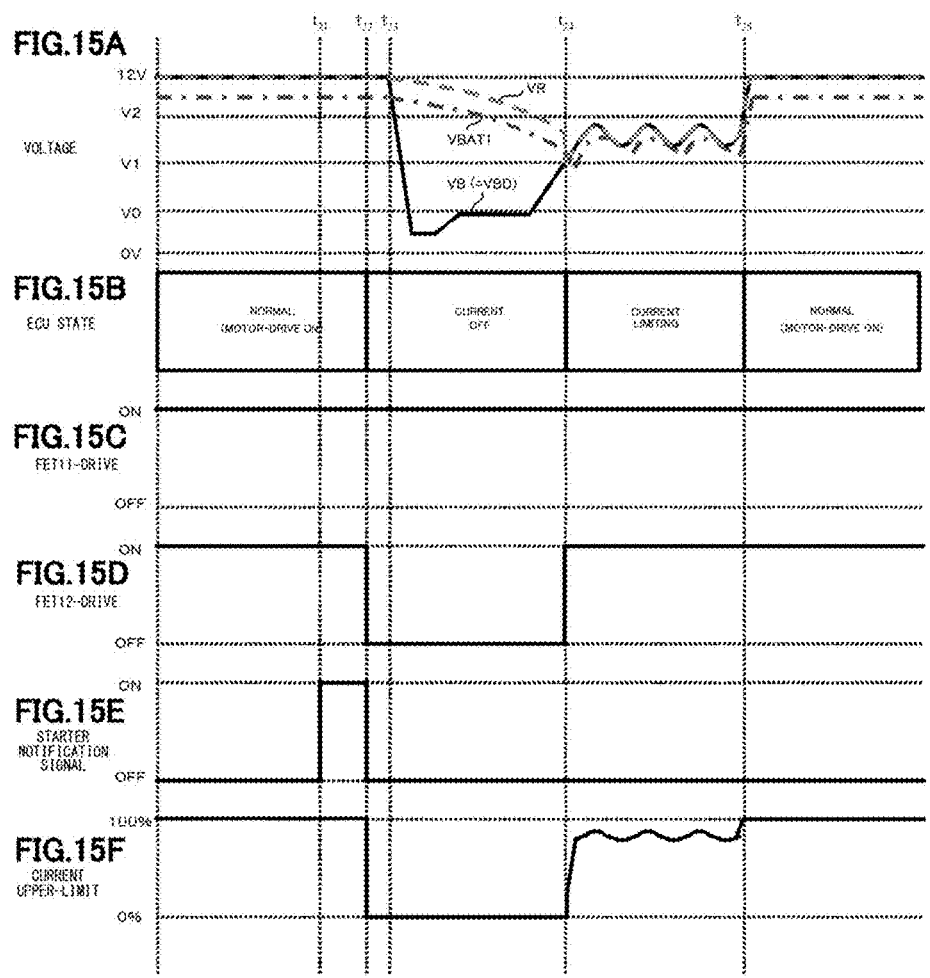
FIGS. 15A-15F are time chart showing an operation example (example 1) of the present invention.
Figure 16:
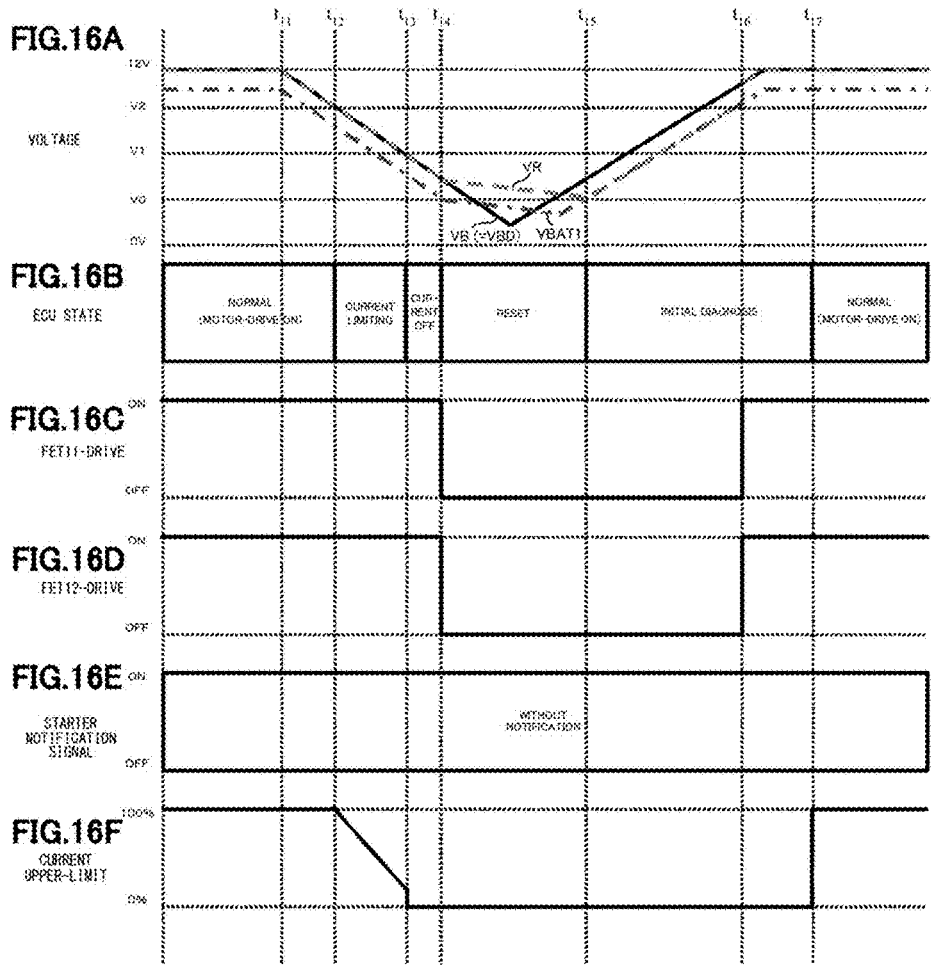
FIGS. 16A-16F are time chart showing another operation example of the conventional example.

FIGS. 14A to 14F are time charts of the conventional example, and FIGS. 15A to 15F are time charts of the example 1. FIG. 14A shows changes in the battery voltage VB (or the battery voltage detected—value VBD), the motor driving voltage VR and the control section supply-voltage VBAT1, and VB (VBD), the motor driving voltage VR and the supply voltage VBAT1 are indicated by a solid line, a broken line and a dashed line, respectively. Note that the normal battery voltage is 12 [V], V1 and V2 are V1 and V2 shown in FIG. 12, and V0 is the reset voltage. FIG. 14B shows the state of the ECU. FIG. 14C shows the "ON/OFF" state of the FET 11. FIG. 14D shows the "ON/OFF" state of the FET 12. FIG. 14E shows the reception state of the starter notification signal. FIG. 14F shows the current upper-limit. The same applies to FIG. 15. Note that the current upper-limit shown in FIG. 14F shows data when the current upper-limit is effectively used, and the current upper-limit is "0" when the motor is not started to drive.

As shown in FIGS. 14A to 14F, in the conventional example, when the starter starts at a time point $t_{11}$, there is no starter notification signal since the conventional example is not configured to receive the starter notification signal (refer to FIG. 14E), but the battery voltage VB (battery voltage detected-value VBD) starts to decrease sharply (refer to FIG. 14A). When the battery voltage detected-value VBD becomes not more than the voltage V2 at a time point $t_{12}$, the current upper-limit starts to decrease (refer to FIG. 14F), and the current command value is started to be limited (refer to FIG. 14B). When the battery voltage detected-value VBD becomes lower than the voltage V1 at a time point $t_{13}$, the current upper-limit becomes 0% (refer to FIG. 14F) and the motor stops the drive (refer to FIG. 14B). The battery voltage detected-value VBD continues to decrease thereafter and the control section supply-voltage VBAT1 also decreases. When the control section supply-voltage VBAT1 becomes lower than the reset voltage V0 at a time point $t_{14}$, the control section is reset (refer to FIG. 14B). At this time, the FETs 11 and 12 are turned "OFF" (refer to FIGS. 14C and 14D). When the battery voltage restores, the control section supply-voltage VBAT1 increases, and the control section supply-voltage VBAT1 exceeds the reset voltage V0 at a time point $t_{15}$, the reset of the control section is released (refer to FIG. 12B). After the reset is released, the initial diagnosis begins (refer to FIG. 14B), and the FETs 11 and 12 are turned "ON" at a time point $t_{16}$ during the initial diagnosis (refer to FIGS. 12C and 12D). Then, when the initial diagnosis ends at a time point $t_{17}$, the motor is normally driven (refer to FIG. 14B).

As described above, in the conventional example, when the battery voltage drops due to the start of the starter, the control section is reset, and further, it takes time to start to drive the motor.

On the other hand, as shown in FIGS. 15A to 15F, in the example 1, the starter notification signal is transmitted at a time point $t_{21}$ before the starter is started (refer to FIG. 15E), the motor stops the drive at a time point $t_{22}$, and the FET 12 is turned "OFF" (refer to FIGS. 15B and 15D). Note that the FET 11 is kept "ON" (refer to FIG. 15C). When the starter is started at a time point $t_{23}$, the battery voltage VB (the battery voltage detected-value VBD) starts to decrease sharply. However, the control section supply-voltage VBAT1 does not become lower than the reset voltage V0 because the power is supplied from the electrolytic capacitor C1 (refer to FIG. 15A). Then, when the battery voltage restores and the battery voltage detected-value VBD exceeds the voltage V1 at a time point $t_{24}$, that is, when VBD exceeds the motor-drive permission voltage, the FET 12 is turned "ON" and the motor starts to drive (refer to FIGS. 15B and 15D). At this stage, although the current command value is limited, the limitation on the current command value is released when the battery voltage detected-value VBD exceeds the voltage V2 at a time point $t_{25}$, and the motor can be fully operated (refer to FIG. 15B).

As described above, in the example 1, by utilizing the FET 12 and the electrolytic capacitor C1, the control section is not reset even when the battery voltage drops due to the start of the starter, and the time taken to start to drive the motor can be shortened.

Next, an operation example (the example 2) will described in which the timing of recognizing the limit drop in the battery voltage is the "OFF" condition 1, not the "OFF" condition 2, that is, the battery voltage detected-value is lower than the motor drivable voltage. Other conditions are the same as those in the example 1.

FIGS. 16A to 16F are time charts in the conventional example, and FIGS. 17A to 17F are time charts in the example 2. The data shown in FIGS. 16 A to 16F and FIGS. 17A to 17F are the same as those in FIGS. 14 A to 14F and FIGS. 15A to 157F, respectively.

Changes in each data in the conventional example shown in FIGS. 16A to 16F are basically the same as the changes shown in FIGS. 14A to 14F although the changes are slightly different in each of the voltage values from the drop in the battery voltage to the restoration. Note that, in the second example, the drop in the battery voltage may not be necessarily due to the start of the starter.

Figure 17:
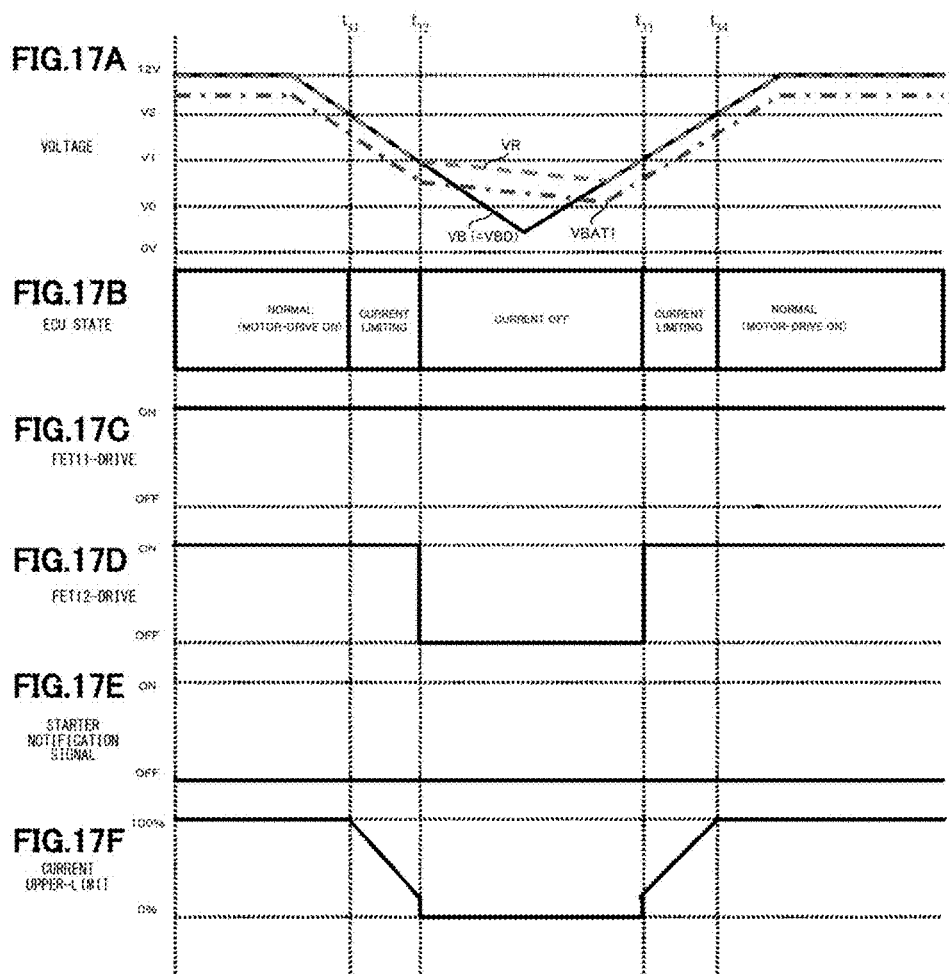
FIGS. 17A-17F are time chart showing an operation example (example 2) of the present invention.

As shown in FIGS. 17A to 17F, in the second example, when the battery voltage VB (the battery voltage detected-value VBD) decreases and the battery voltage detected-value VBD becomes not more than the voltage V2 at a time point $t_{31}$, the current upper-limit starts to decrease (refer to FIG. 17F) and the current command value is started to be limited (refer to FIG. 17B). When the battery voltage detected-value VBD further decreases and becomes lower than the voltage V1 at a time point $t_{32}$, that is, becomes lower than the motor drivable voltage, the motor stops the drive and the FET 12 is turned "OFF" (refer to FIGS. 17B and 17D). Note that the FET 11 is kept "ON" (refer to FIG. 17C). Although the battery voltage detected-value VBD continues to decrease thereafter, the control section supply-voltage VBAT1 does not become lower than the reset voltage V0 because the power is supplied from the electrolytic capacitor C1 (refer to FIG. 17A). Then, when the battery voltage restores and the battery voltage detected-value VBD exceeds the voltage V1 at a time point $t_{33}$, that is, when the voltage VBD exceeds the motor-drive permission voltage, the FET 12 is turned "ON" and the motor starts to drive (refer to FIGS. 17B and 17D). At this stage, although the current command value is limited, the limitation on the current command value is released when the battery voltage detected-value VBD exceeds the voltage V2 at a time point $t_{34}$, and the motor can be fully operated (refer to FIG. 17B).

As described above, also in the example 2, by utilizing the FET 12 and the electrolytic capacitor C1, the control section is not reset even when the battery voltage drops, and further, the time taken to start to drive the motor can be shortened.

Next, an operation example (example 3) will be described in which the timing of turning "ON" the FET 12 is the "ON" condition 2, not the "ON" condition 1, that is, the engine speed satisfies the predetermined control value. Other conditions are the same as those in the example 1.

Figure 18:
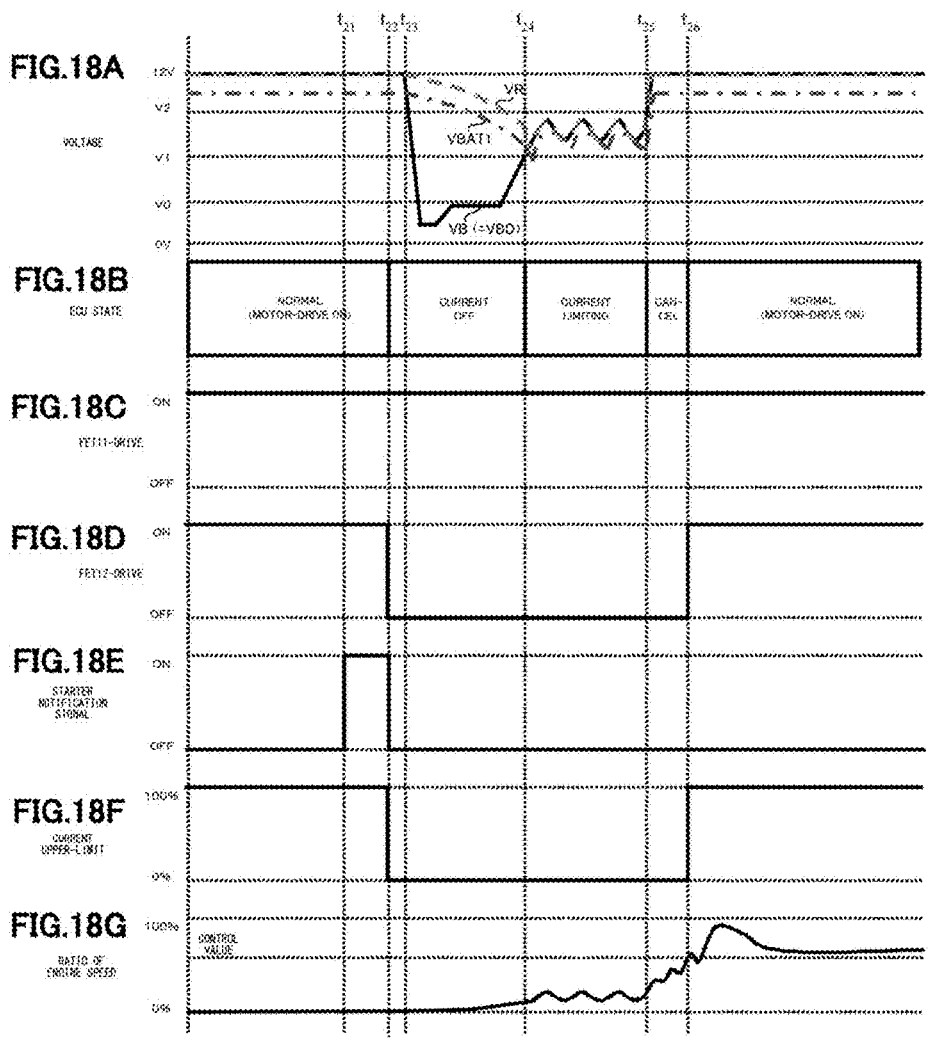
FIGS. 18A-18F are time chart showing an operation example (example 3) of the present invention.

Since the conventional example is the same as that shown in FIGS. 14A to 14F, only a time chart of the example 3 is shown in FIGS. 18A to 18G. FIG. 18G shows the ratio of the engine speed to the maximum allowable engine speed in addition to the data shown in FIGS. 15A to 15F.

In FIGS. 18A to 18G, until the time point $t_{23}$, the changes are the same as those in the timing chart shown in FIGS. 15A to 15F. After the time point $t_{23}$, when the battery voltage restores and the battery voltage detected-value VBD exceeds the voltage V1 at the time point $t_{24}$, the current command value is in a limited state. Moreover, when the battery voltage detected-value VBD exceeds the voltage V2 at the time point $t_{25}$, the current command value is in a limitation released state. However, since the ratio of the engine speed does not exceed the control value, the current command value is "0" and the motor does not start to drive (refer to FIGS. 18B and 18G). Then, when the ratio of the engine speed exceeds the control value at the time point $t_{26}$, the FET 12 is turned "ON" and the motor starts to drive (refer to FIGS. 18B and 18D).

Also in the example 3, by utilizing the FET 12 and the electrolytic capacitor C1, the same effects as those of the examples 1 and 2 can be obtained.

In the above embodiment, N-type (N-channel) FETs are used as the FETs 11 and 12, but P-type (P-channel) FETs may be also used. Moreover, although the assist command is outputted from the MCU to the motor driving circuit to drive the motor, the current command value may have a function of the assist command.

Figure 19:
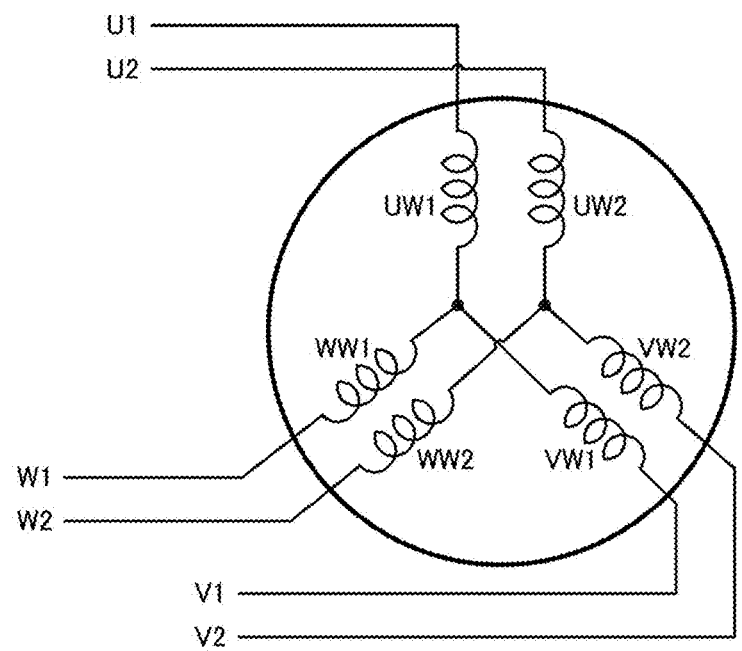
FIG. 19 is a schematic diagram showing a winding structure (star-connection) of a dual-system motor.
Figure 20:
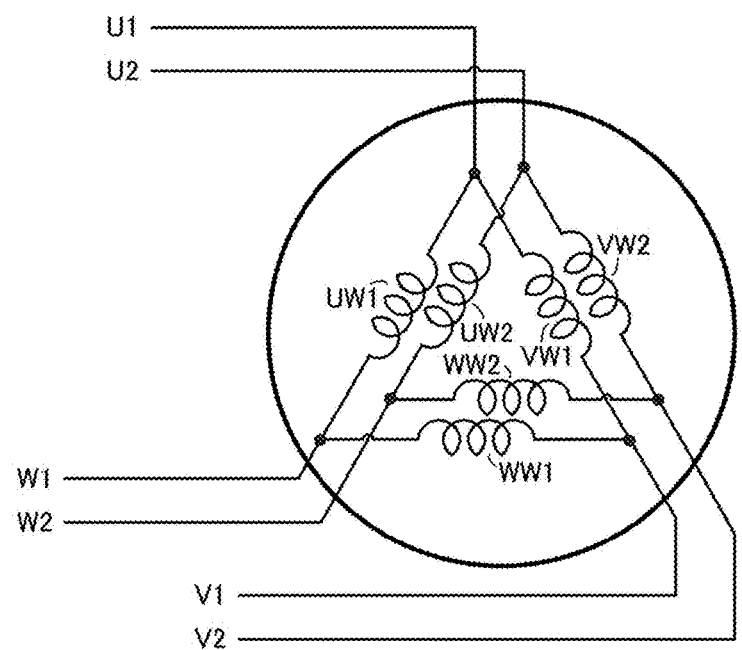
FIG. 20 is a schematic diagram showing a winding structure (delta-connection) of a dual-system motor.

In recent years, redundancy of the steering system has been requested, and a motor having multi-system motor windings is also used as a motor for assist control. For example, FIG. 19 shows a three-phase motor in star-connection. One system is configured with a U-phase winding UW1, a V-phase winding VW1 and a W-phase winding WW 1, and another system is configured with a U-phase winding UW2, a V-phase winding VW2 and a W-phase winding WW2. The motor is driven by flowing a three-phase current to the windings UW1 to WW1 and/or the windings UW2 to WW2. Furthermore, FIG. 20 shows a three-phase motor in delta-connection. One system is configured with a U-phase winding UW1, a V-phase winding VW1 and a W-phase winding WW 1, and another system is configured with a U-phase winding UW2, a V-phase winding VW2 and a W-phase winding WW2. The motor is driven by flowing a three-phase current to the windings UW1 to WW1 and/or the windings UW2 to WW2. It is also desired to avoid the power supply reset of the control section (MCU, microcomputer) as much as possible even with respect to the control of the motor having such multi-system motor windings.

Figure 21:
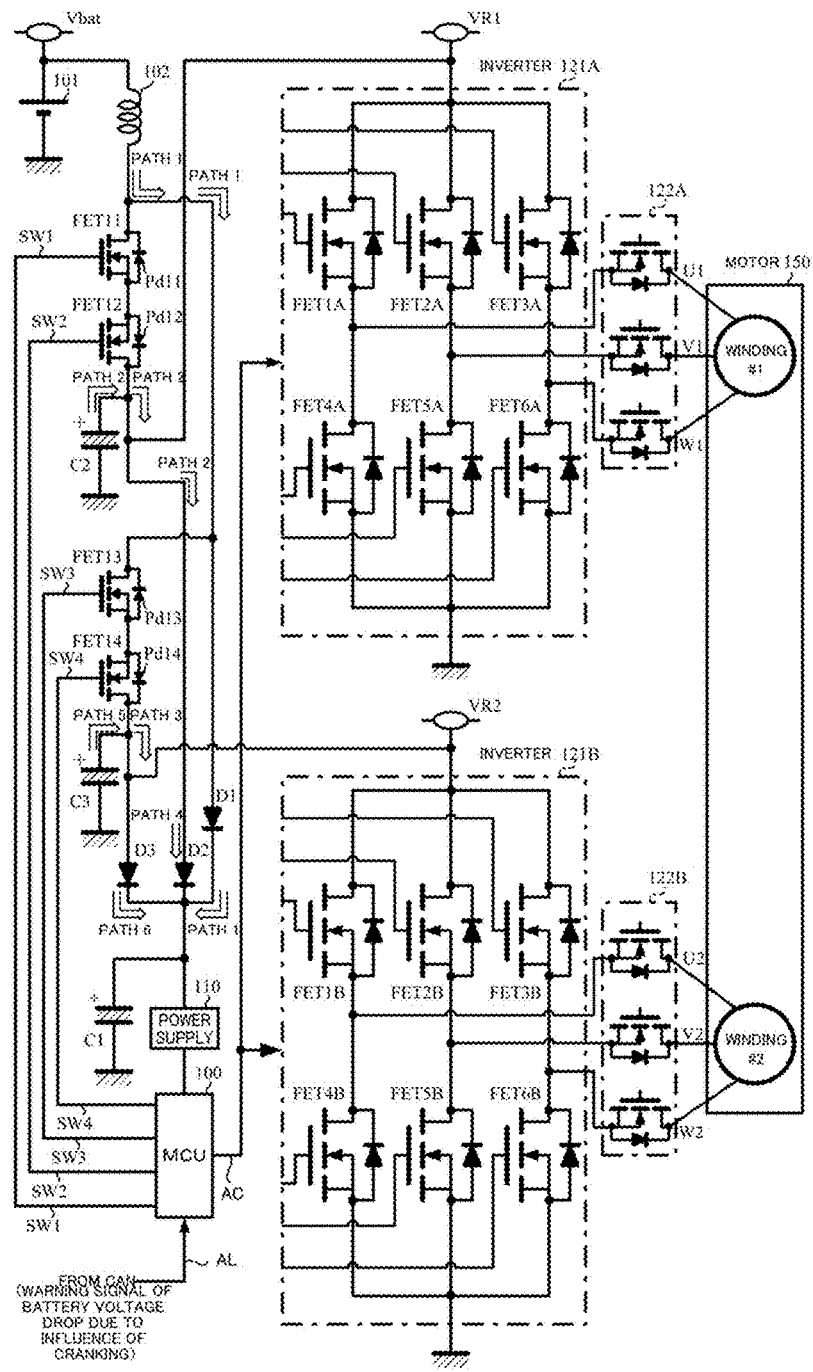
FIG. 21 is a connection diagram showing a configuration example (the sixth embodiment) of the present invention.

FIG. 21 shows a configuration example (the sixth embodiment) of a control unit for a motor 150 having multi-system motor windings. In the present embodiment, the duplexing will be described with an example of the motor 150 having dual-system motor windings as shown in FIG. 19 or FIG. 20. Thus, the inverters are also duplexed (121A and 121B).

Power is supplied to the control section normally from a battery 101 (Vbat). An MCU 100 incorporated in an ECU drives and controls the first system winding of the motor 120 through the inverter 121A by the assist command AC and drives and controls the second system windings of the motor 150 through the inverter 121B. A motor release switch 122A is interposed between the inverter 121A and the first system windings of the motor 150, and a motor release switch 122B is interposed between the inverter 121B and the second system windings of the motor 150. An inverter power supply VR1 is supplied to the inverter 121A, and an inverter power supply VR2 is supplied to the inverter 121B. The motor release switches 122A and 122B are each configured with FETs inserted in each phase (U1 to W1, U2 to W2), and each FET is connected to a parasitic diode.

The inverter power supply VR1 is supplied to a power supply 110 of an MCU 100 via a back flow preventing diode D2 as well as charges a large-capacitance electrolytic capacitor C2. Moreover, the inverter power supply VR2 is supplied to the power supply 110 of the MCU 100 via a back flow preventing diode D3 as well as charges a large-capacitance electrolytic capacitor C3. The electrolytic capacitors C2 and C3 function normally as power smoothing capacitors of the inverters 121A and 121B, respectively. An electrolytic capacitor C1 connected to the power supply 110 functions as a bypass capacitor of a system power supply.

A voltage Vbat of the battery 101 serving as a power supply, is supplied to the power supply 110 via a noise filter 102 and further via a back flow preventing diode D1. The capacitor C1 used as a bypass capacitor of the system power supply is connected to a connection point of the power supply 110 and the diodes D1, D2 and D3.

A warning signal VF for informing of the drop (including cancellation) in the battery voltage Vbat from a CAN is inputted into the MCU 100 from the CAN. FETs 11 and 12 are connected as assist "ON/OFF" switches between the inverter power supply VR1 and the battery 101. The FETs 11 and 12 are turned "ON/OFF" by switch signals SW1 and SW2 from the MCU 100. Likewise, FETs 13 and 14 are connected as assist "ON/OFF" switches between the inverter power supply VR2 and the battery 101. The FETs 13 and 14 are turned "ON/OFF" by switch signals SW3 and SW4 from the MCU 100.

The FETs 11 and 13 are "ON/OFF" switches for emergency blocking, and the FET 12 and 14 have a function of a back flow protection as well as are "ON/OFF" switches serving as separation means. The FETs 12 and 14 are turned "ON/OFF" by the switch signals SW2 and SW4 based on the input of the warning signal VF to the MCU 100.

Note that the FETs 11 to 14 are configured with N-channel types, and P-channel types are also possible. However, the P-channel types require additional parts and the like, and these types are not realistic in terms of ease of equipping and cost.

Figure 22:
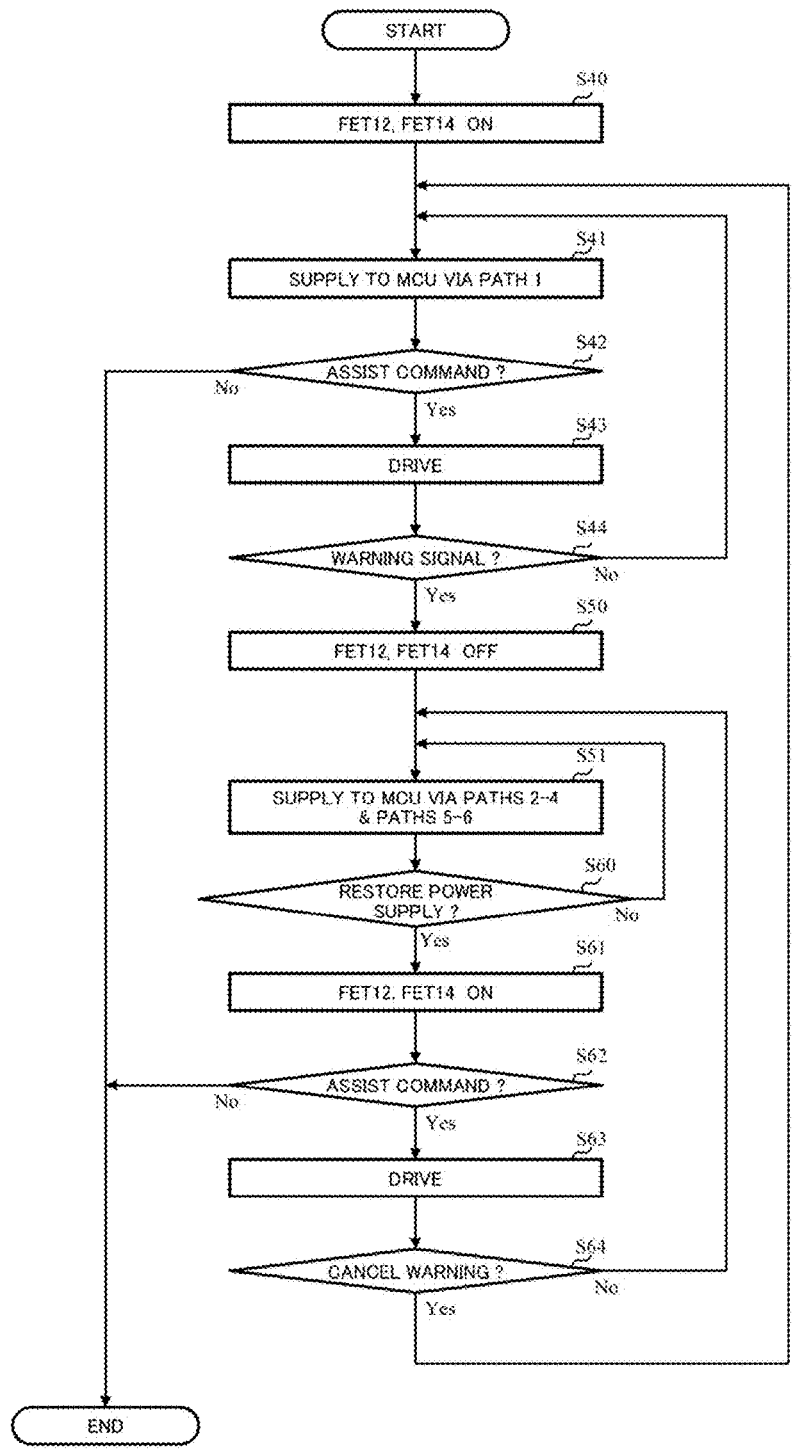
FIG. 22 is a flowchart showing an operation example (the sixth embodiment) of the present invention.

With this configuration, an operation example thereof will be described with reference to a flowchart in FIG. 22.

When the operation starts, the FETs 11 and 13 are normally "ON", the FETs 12 and 14 are turned "ON" by the switch signals SW2 and SW4 (Step S40), and power is supplied to the MCU 100 via the illustrated path 1→the path 1→the path 1 (Step S41). That is, the battery voltage Vbat of the battery 101 is supplied to the power supply 110 via the noise filter 102 and further via the diode D1. Note that the inverter voltage VR1 is a voltage resulted from charging the electrolytic capacitor C2 by the battery voltage Vbat via the noise filter 102, the FET 11 and the FET 12, and the inverter voltage VR2 is a voltage resulted from charging the electrolytic capacitor C3 by the battery voltage Vbat via the noise filter 102, the FET 13 and the FET 14.

Then, when the MCU 100 outputs the assist command AC (Step S42), the inverters 121A and 121B drives the motor 120 by a separately calculated current command value (Step S43). Then, the process returns to the Step S40 and the above operations are repeated until the battery voltage Vbat decreases due to cranking or the like and the warning signal VF is inputted into the MCU 100 from the CAN (Step S44).

In the above Step S44, when the warning signal VF is inputted from the CAN, the MCU 100 turns (or limits) the assist "OFF" from "ON". Then, the MCU 100 outputs the switch signals SW2 and SW4 to turn "OFF" the FETs 12 and 14, which serve as separation means, from "ON" (Step S50). The electric charges charged in the electrolytic capacitor C2 from the battery 101 by turning "OFF" the FET 12, that is, the electric charges charged in the electrolytic capacitor C2 by being temporarily separated from the inverter voltage VR1 are supplied to the power supply 110 via the diode D2 in the path 2 to the path 4 (Step S51). Moreover, the electric charges charged in the electrolytic capacitor C3 from the battery 101 by turning "OFF" the FET 14, that is, the electric charges charged in the electrolytic capacitor C3 by being temporarily separated from the inverter voltage VR2 are supplied to the power supply 110 via the diode D3 in the path 5→the path 3→the path 6 (Step S51). Accordingly, the power supply reset of the MCU 100 is avoided. At this time, the current does not reversely flow to the battery 101 by the parasitic diode pd12 of the FET 12, and the current does not reversely flow to the battery 101 by the parasitic diode pd14 of the FET 14.

Thereafter, whether the power supply is restored (the battery voltage Vbat is not less than the MCU reset voltage) is determined (Step S60). When the power supply is restored, the FETs 12 and 14 are turned "ON" by the switch signals SW2 and SW4 (Step S61), and the assist is turned "ON" from "OFF". At this time, even when the FETs 12 and 14 are not completely turned "ON", power can be automatically (without requiring control of the switches) supplied to the power supplies VR1 and VR2 through the parasitic diodes pd12 and pd14 of the FETs 12 and 14, and the assist can be started immediately.

Then, when the MCU 100 outputs the assist command AC (Step S62), the inverters 121A and 121B drive the motor 120 by the separately calculated current command value (Step S63), and the process returns to the above Step S51 and the above operations are repeated until a signal VF for warning cancellation is inputted from the CAN (Step S64). When the battery voltage restores and the signal VF for warning cancellation is inputted, the process returns to the above Step S41.

When the battery voltage Vbat restores, the motor driving circuit side can be instantaneously charged through the parasitic diodes of the FETs without turning "ON" the FETs 12 and 14 again. Moreover, since the timing of turning "ON" the FETs again after the FETs are turned "OFF" is not the predetermined time, but the timing at which the motor drivable voltage is detected, it is possible to start to drive and control the motor quickly.

Furthermore, when the assist command AC is not outputted at the Steps S42 and S62, the process ends in both cases.

Note that, although the duplexed unit of the motor having the dual-system windings has been described in the above embodiment, the same application is also possible with the multiplexing by triplexing or more. Further, the motor 150 having the multi-system windings can be similarly applied to the aforementioned second to fifth embodiments.

| Explanation of Reference Numerals | |
| --- | --- |
| 1 | handle |
| 2 | column shaft (steering shaft, handle shaft) |
| 10 | torque sensor |
| 12 | vehicle |
| 13, 101 | battery |
| 20, 120, 150 | motor |
| 23, 122, 122A, 122B | motor release switch |
| 30 | control unit |
| 31 | current command value calculating section |
| 37, 121, 121A, 121B | inverter |
| 102 | noise filter |
| 110 | power supply |
| 123 | control section |

| | |
|---|---|
| Explanation of Reference Numerals | |
| 140 | communication section |
| 410 | motor current limiting section |

The invention claimed is:

1. A motor control unit that drives a motor through a motor driving circuit based on a calculated command value calculated by an MCU to which a power supply voltage is supplied from a power supply, comprising:
a large-capacitance capacitor for charging and discharging electric charges of a motor driving voltage supplied to said motor driving circuit;
a first FET with a parasitic diode, which is "ON/OFF"-controlled by said MCU and for separating said large-capacitance capacitor from said power supply voltage at a time of "OFF";
a second FET with a parasitic diode for an emergency blocking interposed between said power supply and said first FET; and
a voltage detecting section to detect said power supply voltage and to input to said MCU;
wherein a forward direction of said parasitic diode of said first FET and a forward direction of said parasitic diode of said second FET are inverse,
wherein said power supply voltage is supplied to said MCU through a noise filter, and back flow preventing diodes are inserted in both a current supply path from said power supply voltage to said MCU and a current supply path from said large-capacitance capacitor to said MCU,
wherein when said MCU recognizes as a limit drop in said power supply voltage that a voltage detected by said voltage detecting section is lower than a predetermined threshold, said first FET is turned-"OFF", said large-capacitance capacitor is separated from said power supply voltage without a back flow to said power supply voltage by said parasitic diode of said first FET, and a voltage is applied to said MCU from said large-capacitance capacitor so as to avoid a power supply reset of said MCU,
wherein when said MCU recognizes a restoration of said power supply voltage, said first FET is turned-"ON", said large-capacitance capacitor is connected to said power supply voltage and a voltage is applies from said large-capacitance capacitor to said MCU, and
wherein said power supply voltage is automatically supplied to said motor driving circuit and said large-capacitance capacitor by said parasitic diodes of said first and second FETs even when said first FET is not completely turned-"ON".

2. The motor control unit according to claim 1, wherein said MCU recognizes as said limit drop in said power supply voltage when a notification signal for notifying an engine start is received.

3. The motor control unit according to claim 2, wherein said MCU recognizes as said restoration of said power supply voltage when a voltage detected by said voltage detecting section is higher than said threshold.

4. The motor control unit according to claim 2, wherein said MCU recognizes as said restoration of said power supply voltage when an engine speed satisfies a predetermined control value.

5. The motor control unit according to claim 1, wherein said MCU recognizes as said restoration of said power supply voltage when a voltage detected by said voltage detecting section is higher than said threshold.

6. The motor control unit according to claim 1, wherein said MCU recognizes as said restoration of said power supply voltage when an engine speed satisfies a predetermined control value.

7. The motor control unit according to claim 1, wherein said voltage detection section detects a voltage of said power supply side of said first FET.

8. The motor control unit according to claim 1, wherein said voltage detecting section detects a voltage of said large-capacitance capacitor side of said first FET.

9. The motor control unit according to claim 1, comprising a motor current limiting section which limits a current for driving said motor so that said current does not exceed a predetermined upper-limit, and said upper-limit is set according to a value of said power supply voltage.

10. An electric power steering apparatus equipped with the motor control unit according to claim 1, wherein an assist force is applied to a steering system of a vehicle by a current command value calculated based on at least a steering torque.

11. A vehicle equipped with said electric power steering apparatus according to claim 10.

12. A motor control unit that drives a motor with dual-system motor windings through dual-system motor driving circuits provided with inverters based on calculated command value calculated by an MCU being supplied power supply voltage from a power supply, comprising:
large-capacitance capacitors of dual-system to charge and discharge electric charges of respective motor driving circuit voltages to supply to said dual-system motor driving circuits;
first FETs of dual-system to respectively separate said large-capacitance capacitors of dual-system from said power supply voltage; and
second FETs of dual-system for an emergency blocking interposed between said power supply and said first FETs;
wherein forward directions of parasitic diodes of said first FETs and forward directions of parasitic diodes of said second FETs are respectively inverse,
wherein said power supply voltage is supplied to said MCU through a noise filter, and back flow preventing diodes are inserted in both a current supply path from said power supply voltage to said MCU and a current supply path from said large-capacitance capacitors of dual-system to said MCU,
wherein when an engine start notification signal for notifying an engine start is inputted into said MCU, due to "OFF" of said first FETs of dual-system, said large-capacitance capacitors of dual-system are separated from said power supply voltage without back flows to said power supply voltage by said parasitic diodes of said first FETs of dual-system, and voltages are applied to said MCU from said large-capacitance capacitors of dual-system so as to avoid a power supply reset of said MCU, and
wherein said power supply voltage is automatically supplied to said motor driving circuits of dual-system and said large-capacitance capacitors of dual-system by said parasitic diodes of said first FETs of dual-system and second FETs of dual-system even when said first FETs of dual-system are not completely turned-"ON".

13. An electric power steering apparatus equipped with the motor control unit according to claim 12, wherein an assist force is applied to a steering system of a vehicle by a current command value calculated based on at least a steering torque.

14. A vehicle equipped with said electric power steering apparatus according to claim 13.

\* \* \* \* \*